United States Patent
Kim et al.

(10) Patent No.: US 9,603,084 B2
(45) Date of Patent: Mar. 21, 2017

(54) METHOD AND APPARATUS FOR MEASURING RADIO RESOURCE MANAGEMENT, AND METHOD AND APPARATUS FOR SIGNALLING SIGNAL TO MEASURE RADIO RESOURCE MANAGEMENT

(71) Applicant: Electronics and Telecommunications Research Institute, Daejeon (KR)

(72) Inventors: Cheulsoon Kim, Daejeon (KR); Young Jo Ko, Daejeon (KR); Joonwoo Shin, Daejeon (KR); Sung-Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 14/603,968

(22) Filed: Jan. 23, 2015

(65) Prior Publication Data
US 2015/0215856 A1    Jul. 30, 2015

(30) Foreign Application Priority Data

Jan. 24, 2014   (KR) .................. 10-2014-0008712
Feb. 5, 2014    (KR) .................. 10-2014-0013299
May 12, 2014    (KR) .................. 10-2014-0056617
Jun. 2, 2014    (KR) .................. 10-2014-0067144

(Continued)

(51) Int. Cl.
*H04W 80/04*    (2009.01)
*H04W 48/16*    (2009.01)
*H04W 24/08*    (2009.01)
*H04W 84/04*    (2009.01)

(52) U.S. Cl.
CPC .......... *H04W 48/16* (2013.01); *H04W 24/08* (2013.01); *H04W 84/045* (2013.01)

(58) Field of Classification Search
CPC . H04W 72/1289; H04W 48/16; H04W 24/10; H04W 48/12; H04W 80/04; H04W 84/12
See application file for complete search history.

(56) References Cited

U.S. PATENT DOCUMENTS

2013/0114526 A1   5/2013   Etri
2014/0162671 A1   6/2014   Etri
(Continued)

FOREIGN PATENT DOCUMENTS

KR   1020140095994 A   8/2014

OTHER PUBLICATIONS

3rd Generation Partnership Project; Technical Specification Group Radio Access Network; Small Cell Enhancements for E-UTRA and E-UTRAN—Physical layer aspects, 3GPP TR 36.872, Dec. 2013, pp. 1-100, v12.1.0.

(Continued)

*Primary Examiner* — Chiho Lee
(74) *Attorney, Agent, or Firm* — William Park & Associates Ltd.

(57) ABSTRACT

In an environment in which a macrocell and a plurality of small cells exist, a terminal receives a discovery signal from a first small cell adjacent to the terminal among the plurality of small cells. When the first small cell is in a predetermined state, the terminal measures RRM of the first small cell based on the discovery signal.

20 Claims, 20 Drawing Sheets

(30) Foreign Application Priority Data

Aug. 18, 2014 (KR) ........................ 10-2014-0106842
Jan. 6, 2015 (KR) ........................ 10-2015-0001419

(56) References Cited

U.S. PATENT DOCUMENTS

| | | | | |
|---|---|---|---|---|
| 2014/0301301 A1* | 10/2014 | Cheng | ................... | H04L 5/0048 370/329 |
| 2014/0314000 A1* | 10/2014 | Liu | ..................... | H04W 72/042 370/329 |
| 2015/0223149 A1* | 8/2015 | Liu | ....................... | H04W 48/12 370/252 |
| 2015/0223245 A1* | 8/2015 | Cheng | ...................... | H04L 5/00 370/329 |
| 2015/0257024 A1* | 9/2015 | Baid | ..................... | H04W 24/10 370/338 |
| 2015/0270936 A1* | 9/2015 | Han | ...................... | H04L 5/0048 370/329 |
| 2016/0043843 A1* | 2/2016 | Liu | ....................... | H04L 5/0048 370/329 |
| 2016/0057737 A1* | 2/2016 | Kim | ................... | H04W 72/1289 370/329 |
| 2016/0066255 A1* | 3/2016 | Marinier | .............. | H04W 48/16 370/350 |
| 2016/0150431 A1* | 5/2016 | Zhang | ................... | H04W 48/16 370/252 |
| 2016/0183173 A1* | 6/2016 | Harada | | |

OTHER PUBLICATIONS

Enhancements of RRM measurements for small cell on/off, 3GPP TSG RAN WGl Meeting #76, Feb. 2014, R1-140038, Prague, Czech Republic.

Evaluation results for different small cell on/off operational modes, 3GPP TSG RAN WG1 Meeting #75, Nov. 2013, R1-135876, San Francisco, USA.

Discussion on discovery and measurement for small cell on/off, 3GPP TSG RAN WWG1 Meeting #76, Feb. 2014, R1-140191, Prague, Czech Republic.

Discussiong on small cell discovery and measurement, 3GPP TSG-RAN WG1 #76, Feb. 2014, R1-140119, Prague, Czech.

Discovery signal design for small cell on/off, 3GPP TSG RAN WG1 Meeting #76, Feb. 2014, R1-140213, Prague, Czech Republic.

DRS based RRm measurement and network assistance information, 3GPP TSG RAN WG1 Meeting#78, Aug. 2014, R1-140346, ETRI, Dresden, Germany.

Remaining issues on CSI feedback for eIMTA, 3GPP TSG RAN WG1 #76, Feb. 2014, R1-140347, Samsung, Prague, Czech Republic.

Small cell discovery, 3GPP TSG-RAN WG1 #76, Feb. 2014, R1-140453, Qualcomm Incorporated, Prague Czech Republic.

Views on discovery signal design for Rel-12 small cell enhancement, 3GPP TSG RAN WG1 Meeting #76, Feb. 2013, R1-140622, NTT DoCoMo, Prague, Czech Republic.

Discovery signal(s) and measurements, 3GPP TSG RAN WG1 Meeting #76bis, Apr. 2014, R1-141266, ETRI, Shenzhen, China.

Small cell enhancements-physical layer aspects, 3GPP TSG RAN Meeting #62, Dec. 2013, RP-132073, Huawei, CATR, HiSilicon.

Draft Report of 3GPP TSG RAN WG1 #76 v0.2.0, 3GPP TSG RAN WG1 Meeting #76bis, Mar.-Apr. 2014, MCC Support, Shenzhen, China.

RAN1 Chairman's Notes, 3GPP TSG RAN WG1 Meeting #76bis, Mar.-Apr. 2014, Shenzhen, China.

Views on Transition Time Reduction for Small Cell On/Off, 3GPP TSG RAN WG1 Meeting #76bis, Mar.-Apr. 2014, R1-141464, NTT DoCoMo, Shenzhen, China.

LS on Activation/deactivation for Dual Connectivity, 3GPP TSG RAN WG1 Meeting #77, May 2014, R1-141909, RAN2, Seoul, Korea.

WF on DRS RSSI and RSRQ, 3GPP TSG RAN WG1 Meeting #77, May 2014, R1-142744, Huawei, HiSilicon, NTT DoCoMo, Sharp, Broadcom, Samsung, Hitachi, Seoul, Korea.

Views on Discovery Signal-based RSRQ Measurement, 3GPP TSG RAN WG1 Meeting #76bis, Mar.-Apr. 2014, R1-141467, NH DoCoMo, Shenzhen, China.

Detailed Design of Discovery Signal(s), 3GPP TSG RAN WG1 Meeting #77, May 2014, R1-142209, ETRI, Seoul, Korea.

3rd Generation Partnership Project; Technical Specification Group Radio Access Network; Evolved Universal Terrestrial Radio Access (E-UTRA); Requirements for Support Radio Resource Management, 3GPP TS 36.133, Dec. 2013, V. 12.2.0.

\* cited by examiner

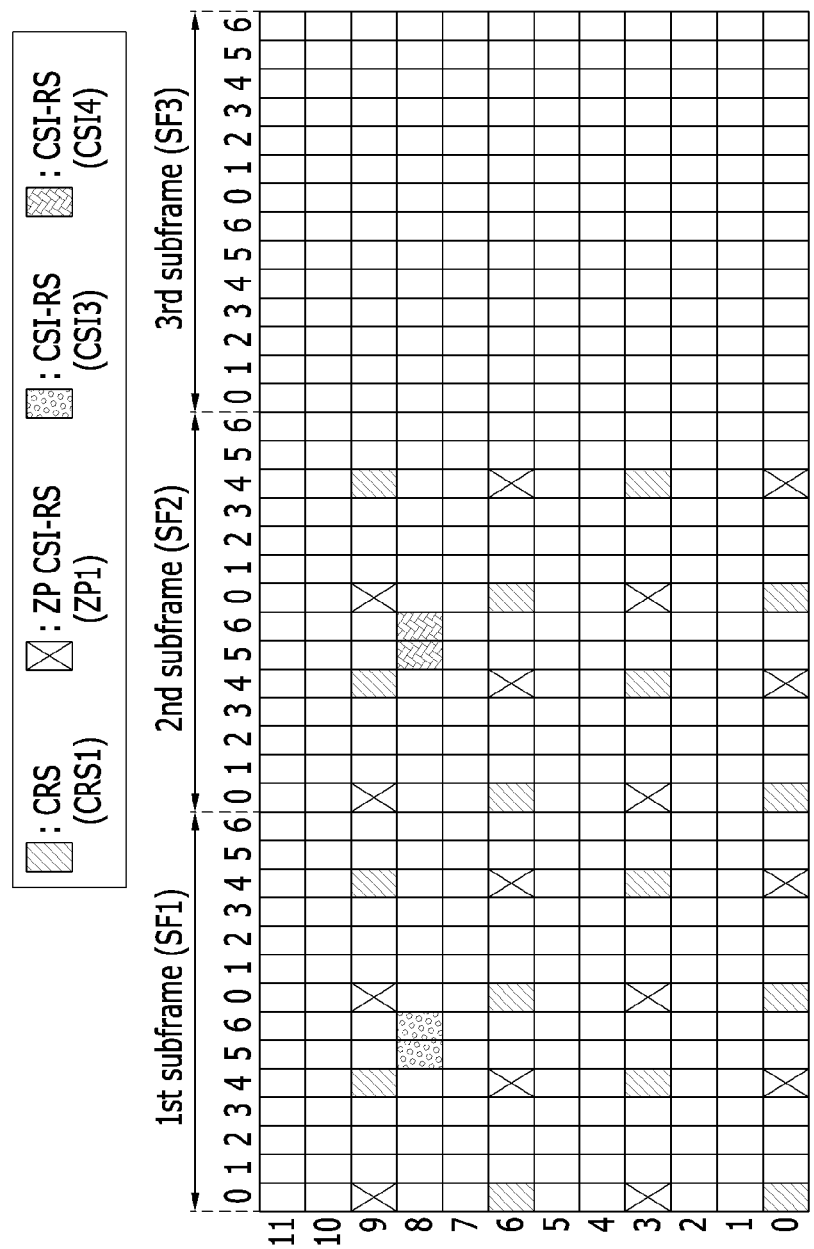

METHOD AND APPARATUS FOR MEASURING RADIO RESOURCE MANAGEMENT, AND METHOD AND APPARATUS FOR SIGNALLING SIGNAL TO MEASURE RADIO RESOURCE MANAGEMENT

CROSS-REFERENCE TO RELATED APPLICATION

This application claims priority to and the benefit of Korean Patent Application Nos. 10-2014-0008712, 10-2014-0013299, 10-2014-0056617, 10-2014-0067144, 10-2014-0106842, and 10-2015-0001419 filed in the Korean Intellectual Property Office on Jan. 24, 2014, Feb. 5, 2014, May 12, 2014, Jun. 2, 2014, Aug. 18, 2014, and Jan. 6, 2015, the entire contents of which are incorporated herein by reference.

BACKGROUND OF THE INVENTION (a) Field of the Invention

The present invention relates to a method and apparatus for measuring Radio Resource Management (RRM). Further, the present invention relates to a method and apparatus for signaling a signal for measuring RRM.

(b) Description of the Related Art

In order to discover a cell, a terminal measures RRM of the cell.

In an environment in which a macrocell and small cells are mixed, in order for a terminal to discover the small cells, technology that can efficiently measure RRM is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus having advantages of efficiently measuring RRM in an environment in which a macrocell and a plurality of small cells exist.

The present invention has been made in a further effort to provide a method and apparatus having advantages of efficiently signaling a signal for measuring RRM in an environment in which a macrocell and a plurality of small cells exist.

An exemplary embodiment of the present invention provides a method in which a terminal measures Radio Resource Management (RRM) in an environment in which a macrocell and a plurality of small cells exist. The method includes: receiving a discovery signal from a first small cell adjacent to the terminal among the plurality of small cells; and measuring, when the first small cell is in a predetermined state, RRM of the first small cell based on the discovery signal.

The predetermined state includes a first state in which the first small cell can transmit other signals in addition to the discovery signal and a second state in which the first small cell can transmit only the discovery signal.

The method may further include: receiving a measurement subframe bit pattern representing a measurement subframe in which the terminal can measure RRM based on the discovery signal and a non-measurement subframe in which the terminal cannot measure RRM from a serving cell; and receiving a transmission period of the discovery signal and subframe offset of the discovery signal from the serving cell.

The measuring of RRM may include: determining the measurement subframe using the measurement subframe bit pattern; determining a first subframe in which the discovery signal is received using a transmission period of the discovery signal and subframe offset of the discovery signal; and measuring RRM of the first small cell based on the discovery signal in the first subframe of the measurement subframes.

The receiving of a measurement subframe bit pattern may include: receiving a first measurement subframe bit pattern and a second measurement subframe bit pattern of the measurement subframe bit patterns from the serving cell; and receiving first measurement configuration information corresponding to the first measurement subframe bit pattern and second measurement configuration information corresponding to the second measurement subframe bit pattern from the serving cell.

The first small cell may include a second small cell and a third small cell.

The measuring of RRM may include: measuring RRM of the second small cell based on the first measurement configuration information; and measuring RRM of the third small cell based on the second measurement configuration information.

A subframe set corresponding to the first measurement subframe bit pattern may include a subframe that is set to an Almost Blank Subframe (ABS).

A subframe set corresponding to the second measurement subframe bit pattern may include a subframe that is set to a non-ABS.

Another embodiment of the present invention provides a method in which a serving cell transmits a signal for measuring RRM in an environment in which a macrocell and a plurality of small cells exist. The method includes: transmitting a transmission period of a discovery signal and subframe offset of the discovery signal to a terminal; and transmitting a measurement subframe pattern representing a measurement subframe in which RRM measurement based on the discovery signal is allowed and a non-measurement subframe in which the RRM measurement is not allowed to the terminal.

The method may further include setting, by the serving cell, a Measurement Gap (MG) so that the terminal receives the discovery signal that is transmitted in a frequency that is different from a serving frequency used by the serving cell for transmitting the discovery signal and measures RRM.

The transmitting of a measurement subframe pattern may include setting a length of the measurement subframe pattern to a least common multiple of a transmission period of the discovery signal and an MG Repetition Period (MGRP).

The transmitting of a measurement subframe pattern may include transmitting a first measurement subframe pattern for the serving frequency among the measurement subframe patterns and a second measurement subframe pattern for a frequency that is different from the serving frequency to the terminal.

The setting of a Measurement Gap (MG) may include setting, by the serving cell, the MG for the terminal according to whether the terminal has a capability to receive the discovery signal that is transmitted in a frequency that is different from the serving frequency.

The measurement subframe pattern may include a first measurement subframe pattern.

The transmitting of a measurement subframe pattern may include: transmitting the first measurement subframe pattern representing the measurement subframe and the non-measurement subframe belonging to the MG in a bit map form having the same length as that of the MG to the terminal; and transmitting information about a frequency in which the first measurement subframe pattern is to be used to the terminal.

The setting of a Measurement Gap (MG) may include: setting a first MG of the MGs; and setting a second MG having subframe offset that is different from that of the first MG of the MGs together with the first MG.

The setting of a second MG may include setting subframe offset for the second MG to a value that adds a length of the first MG to subframe offset for the first MG.

The setting of a second MG may further include setting a length of the second MG so that the sum of lengths that the first MG and the second MG occupy when the second MG is set together with the first MG is equal to or smaller than a length that the first MG occupies when only the first MG is set without the second MG.

The discovery signal may include at least one of a Primary Synchronization Signal (PSS), a Secondary Synchronization Signal (SSS), a Cell-specific Reference Signal (CRS), and a Channel State Information-Reference Signal (CSI-RS).

The setting of a Measurement Gap (MG) may include: setting a length of the MG to a value other than 6 ms; and setting an MG Repetition Period (MGRP) so that a ratio between a length of the MG and the MGRP becomes one of 0.15 and 0.075.

Yet another embodiment of the present invention provides a method in which a terminal measures Radio Resource Management (RRM) in an environment in which a macrocell and a plurality of small cells exist. The method includes: receiving configuration information of a Measurement Gap (MG) from a serving cell; receiving a first measurement subframe pattern representing a measurement subframe in which RRM measurement based on a discovery signal is allowed and a non-measurement subframe in which the RRM measurement is not allowed among subframes that are included in the MG from the serving cell; determining the measurement subframe that is included in the MG based on the MG configuration information and the first measurement subframe pattern; and measuring RRM in the measurement subframe of the MG using the discovery signal that is transmitted in a frequency that is different from a serving frequency used by the serving cell for transmitting the discovery signal.

The receiving of configuration information of the Measurement Gap (MG) may include receiving the MG configuration information including subframe offset and a length of a first MG of the MGs and including subframe offset and a length of a second MG of the MGs.

Subframe offset of the first MG and subframe offset of the second MG may be different.

The receiving of a first measurement subframe pattern may include receiving the first measurement subframe pattern in a bit map form having the same length as that of the MG from the serving cell.

BRIEF DESCRIPTION OF THE DRAWINGS

FIGS. 13A and 13B are diagrams illustrating an example of a DRS occasion in which a terminal receives.

DETAILED DESCRIPTION OF THE EMBODIMENTS

Figure 1:
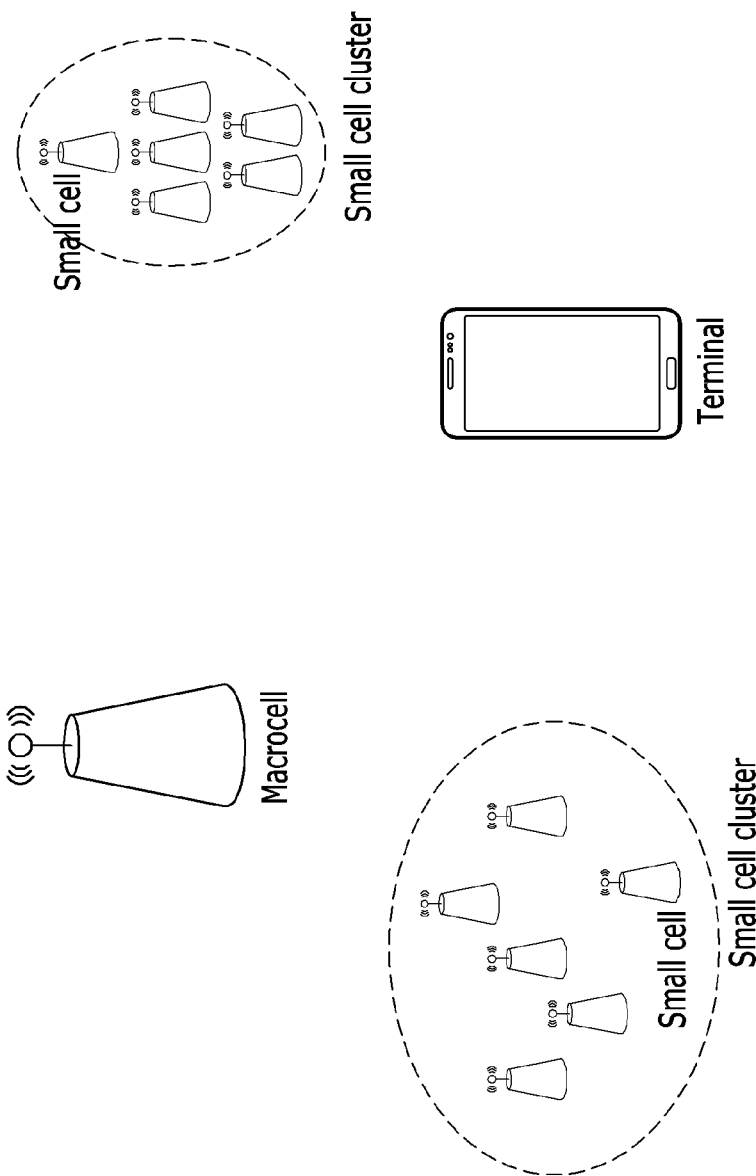
FIG. 1 is a diagram illustrating an environment in which a macrocell and a plurality of small cells are mixed.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a macro cell may indicate a base station (BS), a macro base station, an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a function of the BS, and an HR-RS that performs a function of the BS, and may include an entire function or a partial function of the BS, the ABS, the HR-BS, the nodeB, the eNodeB, the AP, the RAS, the BTS, the MMR-BS, the RS, the HR-RS, and the macro base station.

Further, a small cell may indicate a base station (BS), a small base station, an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a function of the BS, and an HR-RS that performs a function of the BS, and may include an entire function or a partial function of the BS, the ABS, the HR-BS, the nodeB, the eNodeB, the AP, the RAS, the BTS, the MMR-BS, the RS, the HR-RS, and the small base station.

1. Small Cell Discovery Summary

FIG. 1 is a diagram illustrating an environment in which a macrocell and a plurality of small cells coexist.

The macrocell and the plurality of small cells are mixed. Particularly, regionally adjacently small cells may form a small cell cluster. It may be assumed that ideal backhaul or non-ideal backhaul that supports an X2 interface exists between the macrocell and the small cells or between the small cells.

The small cell may have three states (an active state, a discontinuous transmission state, and a dormant state). The small cell of an active state follows a Release-11 (Rel-11) specification and may transmit a Discovery Signal (DRS) and other signals in addition to the DRS signal. The small cell of an active state may be regarded as a cell following a Rel-11 specification to a terminal. The small cell of a Discontinuous Transmission (DTx) state transmits only a DRS and does not transmit other signals or channels. The terminal measures a DRS based on DRS configuration information that is received from a serving cell and reports the DRS to the serving cell. The small cell of a dormant state follows a Rel-11 specification and transmits no signal.

The small cell may change a state thereof according to determination of the small cell itself or an instruction of other cells. For example, in order to correspond to a load change of the small cell or a cell adjacent to the terminal, the small cell may be converted from a DTx state to an active state according to an instruction of the adjacent cell. For another example, when an amount of a load that is applied to the small cell of an active state is less, the small cell of an active state may hand over the terminal to the adjacent cell and convert a state thereof to a DTx state or a dormant state.

The small cell transmits a DRS in an active state or a DTx state. A kind, a period, and subframe offset of a DRS may be differently set (configured) according to a state of the small cell. A kind, a period, and subframe offset of a DRS may be equally set regardless of a state of the small cell.

A subframe that transmits a DRS by the small cell may be different at every small cell. The macrocell may control DRS setting of the small cell through backhaul or the small cell itself may control DRS setting. The small cell may not transmit a DRS in an entire subframe but may transmit a DRS in a plurality of consecutive subframes or a plurality of nonconsecutive subframes with a period of several tens of milliseconds or several hundreds of milliseconds.

1.1. Radio Resource Management (RRM) Measurement Based on DRS

A small cell of an active state or a DTx state transmits a DRS. The terminal performs RRM measurement of a cell having transmitted a DRS based on the DRS. A method in which the terminal measures RRM based on a DRS includes a first RRM measurement method and a second RRM measurement method. Specifically, in the first RRM measurement method, when the small cell is in an active state, the terminal performs RRM measurement based on a Cell-specific Reference Signal (CRS), and when the small cell is in a DTx state, the terminal performs RRM measurement based on a DRS. In the second RRM measurement method, the terminal performs RRM measurement based on a DRS regardless of a state of the small cell.

In the first RRM measurement method, the terminal differently performs RRM measurement according to a state of the small cell. For this reason, the terminal should implicitly find a state of the small cell or explicitly receive signaling of a state of the small cell. When the terminal explicitly receives signaling of a state of the small cells adjacent to the terminal from a serving cell of the terminal, a signaling burden of the serving cell may be considerably large. For example, when the number of frequencies that the terminal measures is many, a state conversion time of the small cell is short, and thus when the small cell frequently converts a state, or when the number of adjacent small cells is many, a signaling burden of the serving cell may be considerably large. Therefore, it is more preferable for the terminal to implicitly find a state of the small cell than for the terminal to explicitly receive signaling of a state of the small cell. For example, the terminal may estimate a state of the small cell through detection of a CRS. As the terminal is located at an intermediate portion of the small cell cluster, when the terminal receives severe interference between CRSs, a probability of the terminal detecting a sequence of a CRS is low. When the terminal does not have an interference cancellation function of a CRS, the terminal may not accurately estimate a state of the small cell. Therefore, it is preferable that the terminal performs operation regardless of a state of the small cell, and it is preferable to perform RRM measurement regardless of a state of the small cell. An RRM measurement operation of the terminal for a small cell of an active state and an RRM measurement operation of the terminal for the small cell of a DTx state may be the same. That is, the second RRM measurement method in which the terminal performs RRM measurement based on a DRS regardless of a state (an active state and a DTx state) of the small cell is more preferable than the first RRM measurement method.

1.2. Accuracy of RRM Measurement Based on DRS

When the terminal measures RRM based on a DRS, measurement accuracy of RRM (hereinafter, 'D-RRM') that is measured based on a DRS, Reference Signal Received Power (hereinafter, D-RSRP') RSRP that is measured based on a DRS, and Reference Signal Received Quality (hereinafter, 'D-RSRQ') that is measured based on a DRS may be used for measurement accuracy (hereinafter, 'C-measurement accuracy') that is used for RRM measurement based on a CRS. RRM measurement based on a DRS may include RSRP measurement based on a DRS and RSRQ measurement based on a DRS.

According to TS 36.133, C-measurement accuracy is differently defined according to an intra-frequency, an inter-frequency, whether CRS assistance information is available, whether a Measurement Gap (MG) is set, whether cell global ID is estimated, whether a restricted measurement subframe is set, or whether an Almost Blank Subframe (ABS) and a non-ABS are set. For accuracy (hereinafter, D-measurement accuracy') of RRM measurement based on a DRS, the same reference as that applied to C-measurement accuracy may be reused. Thereby, in an entire case in which RSRP based on a CRS or a RSRQ based on a CRS is used, RSRP based on a DRS or a RSRQ based on a DRS may be used. That is, C-measurement accuracy may be applied to D-RSRP and a D-RSRQ.

2. Method of Measuring RRM in an Intra-Frequency (Hereinafter, 'Intra-Frequency Measurement Method')

Figure 2:
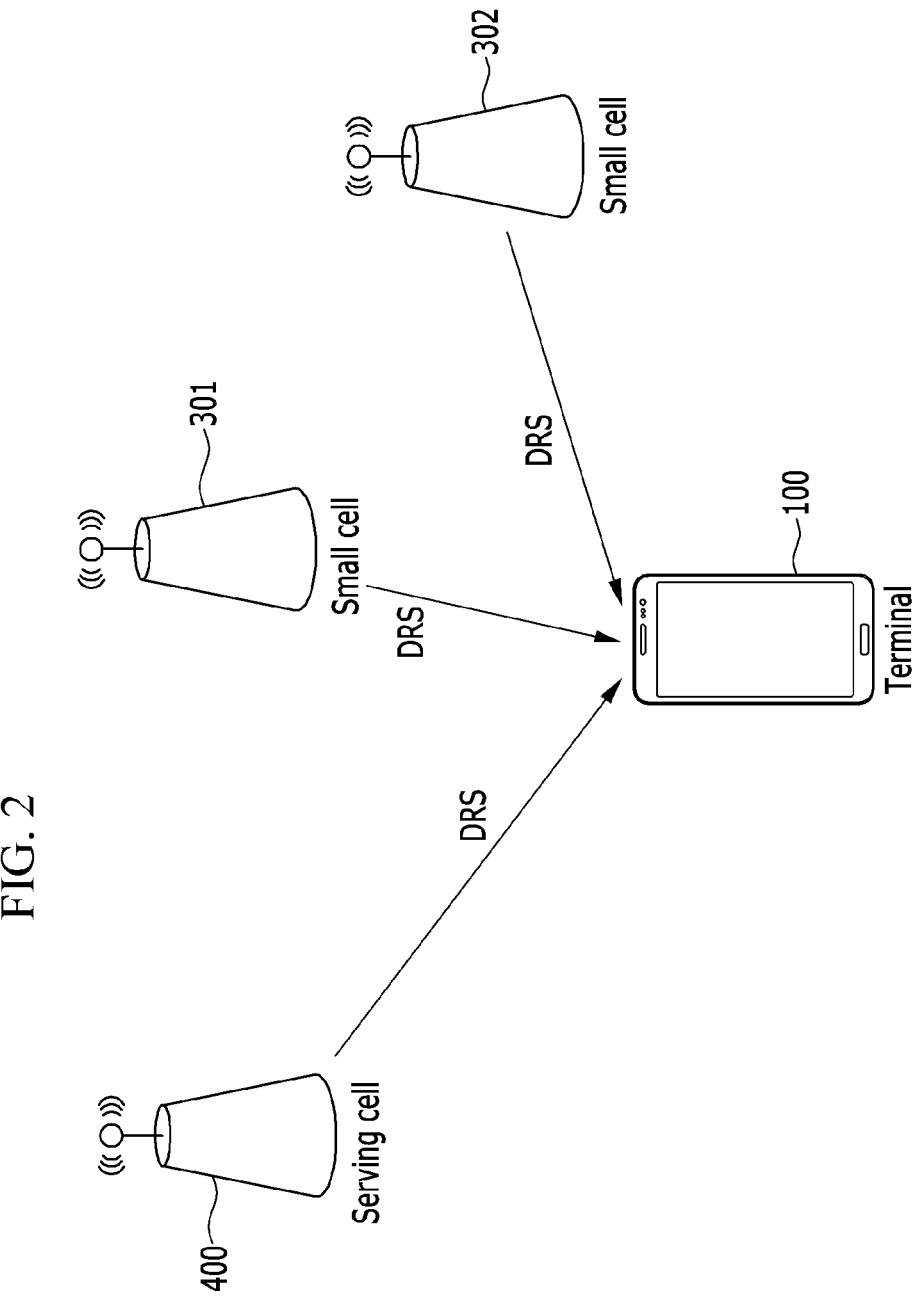
FIG. 2 is a diagram illustrating a case in which a serving cell and adjacent small cells use the same frequency.

RRM measurement of an intra-frequency is performed in consideration of an environment of FIG. 2.

FIG. 2 is a diagram illustrating a case in which a serving cell 400 and adjacent small cells 301 and 302 use the same frequency.

The serving cell 400 of a terminal 100 may be a macrocell or a small cell.

The small cells 301 and 302 adjacent to the terminal 100 among a plurality of small cells use the same frequency as a serving frequency (e.g., F1) of the serving cell 400. The serving cell 400 transmits a DRS using the serving frequency F1, and the small cells 301 and 302 transmit a DRS using the same frequency F1 as a serving frequency of the serving cell 400.

In order to control interference between the serving cell 400 and the small cells 301 and 302 in a time domain, the serving cell 400 or the small cells 301 and 302 may set an ABS pattern (which represents a subframe that is set with an ABS). Specifically, the serving cell 400 or the small cells 301 and 302 may set at least one subframe with an ABS.

The serving cell 400 transmits a measurement subframe pattern to the terminal 100 through Radio Resource Control (RRC) signaling. Specifically, a measurement subframe pattern represents a measurement subframe in which RRM measurement based on a DRS is allowed to the terminal 100 and a non-measurement subframe in which RRM measurement based on a DRS is not allowed to the terminal 100. The measurement subframe pattern may have a bitmap form. For example, when a measurement subframe pattern is '101000', in first and third subframes having a bit of 1, RRM measurement may be performed.

For D-RSRP measurement, the terminal 100 acquires time synchronization and frequency synchronization from a synchronization signal or a DRS, and detects a sequence of a DRS based on the acquired synchronization. The terminal 100 applies filtering of Layer 3 (L3) to a power magnitude of the detected sequence of the DRS and determines an L3 filtered result value to a D-RSRP value.

For D-RSRQ measurement, the terminal 100 acquires time synchronization and frequency synchronization from a synchronization signal or a DRS and induces D-RSRP based on the acquired synchronization. Further, the terminal 100 induces D-RSSI using an Orthogonal Frequency Division Multiplexing (OFDM) symbol of a subframe that is used for inducing D-RSRP. Here, D-RSSI represents a Received Signal Strength Indicator (RSSI) that is measured based on a DRS. The terminal 100 determines a D-RSRQ value based on D-RSRP and D-RSSI.

The terminal 100 may measure D-RRM in a subframe including a DRS. The serving cell 400 enables the terminal to divide a measurement subframe in which the terminal 100 should perform D-RRM and a non-measurement subframe in which the terminal should not perform D-RRM through appropriate signaling (e.g., signaling of a measurement subframe pattern). In order to notify the terminal 100 whether RRM measurement is requested based on a CRS or D-RRM measurement is requested based on a DRS, the serving cell 400 may signal additional configuration information to the terminal 100.

In a Frequency Division Duplex (FDD) system, in order to notify the terminal of a measurement subframe and a non-measurement subframe in 40 subframe units, the serving cell 400 or the base station performs RRC signaling of a bit map. In a Time Division Duplex (TDD) system, in order to notify the terminal of a measurement subframe and a non-measurement subframe in a maximum of 70 subframe units, the serving cell 400 or the base station performs RRC signaling of a bit map. The terminal 100 performs RSRP or RSRQ measurement based on a CRS or a DRS within a subframe corresponding to a bit having a value of 1 among bit maps (e.g., 10101000), and does not perform RRM measurement within a subframe corresponding to a bit having a value of 0 among bit maps.

In a Heterogeneous Network (HetNet) environment in which the serving cell 400 and the small cells 301 and 302 use the same frequency, by applying (setting) a measurement subframe pattern for intercell interference avoidance, the serving cell 400 may acquire an effective RRM measurement result of a Primary Cell (Pcell). In a time domain, the setting number of a measurement subframe pattern for intercell interference avoidance is a unit of several tens. When the serving cell 400 or the small cells 301 and 302 transmit a DRS in a time unit of several tens of milliseconds to several hundreds of milliseconds, the terminal 100 may use a first method or a second method for D-RRM measurement.

2.1. Method in which the Terminal 100 Measures D-RRM Based on a Measurement Subframe Pattern and DRS Configuration Information (First Method)

When the terminal 100 receives setting of a measurement subframe pattern from the serving cell 400, the terminal 100 may perform RRM measurement only in a measurement subframe. When the terminal 100 may know a subframe in which a DRS is transmitted/received, the terminal 100 may determine a subframe that should perform D-RRM measurement. Therefore, the serving cell 400 signals a period of a DRS (transmission period of a DRS) and subframe offset of a DRS to the terminal 100. Even if the terminal 100 does not receive a separate measurement instruction from the serving cell 400, the terminal 100 measures D-RSRP and a D-RSRQ and reports the measured D-RSRP and D-RSRQ to the serving cell 400.

For example, when the terminal 100 receives setting of a measurement subframe pattern from the serving cell 400, the terminal 100 distinguishes a measurement subframe and a non-measurement subframe. When the terminal 100 receives DRS configuration information from the serving cell 400, the terminal 100 derives a DRS subframe based on a period of a DRS (DRS period of the serving cell 400, a DRS period of all adjacent small cells 301 and 302) that is included in DRS configuration information and subframe offset of a DRS. Here, a DRS subframe represents a subframe in which a DRS is transmitted/received. The terminal 100 performs D-RRM measurement in a subframe (e.g., a measurement subframe of DRS subframes) corresponding with a measurement subframe among DRS subframes. The terminal 100 does not perform D-RRM measurement in a subframe (e.g., a non-measurement subframe of DRS subframes) corresponding with a non-measurement subframe of DRS subframes.

For another example, when the terminal 100 receives DRS setting from the serving cell 400 but does not receive setting of a measurement subframe pattern, the terminal 100 derives a DRS subframe based on a period of a DRS and subframe offset of a DRS. The terminal 100 performs D-RRM measurement in the DRS subframe.

2.2. Method in which the Terminal 100 Measures Independent D-RRM Based on Each Measurement Configuration Information Received from the Serving Cell 400 (Second Method)

The serving cell 400 sets a single DRS subframe or a plurality of DRS subframes to the terminal 100 according to interference assumption of the serving cell 400 or an ABS pattern of the serving cell 400 or the adjacent small cells 301 and 302. Further, the serving cell 400 sets a single measurement subframe pattern or a plurality of measurement subframe patterns to the terminal 100. One measurement subframe pattern corresponds to a measurement subframe set including at least one measurement subframe and a non-measurement subframe set including at least one non-measurement subframe. The serving cell 400 may transmit a DRS or may not transmit a DRS in a subframe belonging to each measurement subframe set or each non-measurement subframe set. When the DRS subframe belongs to any one measurement subframe set, the terminal 100 performs D-RRM measurement, and when the DRS subframe belongs to no measurement subframe set, the terminal 100 does not perform D-RRM measurement.

The serving cell 400 may set different D-RRM measurement/reports for each measurement subframe pattern to the terminal 100. For example, the serving cell 400 may set two measurement subframe patterns to the terminal 100 and signal first measurement configuration information corresponding to one measurement subframe pattern and second measurement configuration information corresponding to the remaining one measurement subframe pattern to the terminal 100. The first measurement configuration information and the second measurement configuration information may be different. For example, the first measurement configuration information may include information that instructs D-RSRP measurement, and the second measurement configuration information may include information that instructs D-RSRQ measurement. The terminal 100 performs D-RRM measurement/report according to measurement configuration information (e.g., first measurement configuration information, second measurement configuration information) that is received from the serving cell 400. In each measurement subframe set, because interference conditions that are formed by the serving cell 400 and the adjacent small cells 301 and 302 may be different, it is preferable that the terminal 100 performs different D-RRM measurement/report at each measurement subframe set according to different measurement configuration information that is received from the serving cell 400.

In order to set each measurement subframe pattern, the serving cell 400 may use a bit map defining in TS 36.331. For each measurement subframe pattern, the serving cell 400 may set a period and subframe offset of different DRSs to the terminal 100.

Figure 3:
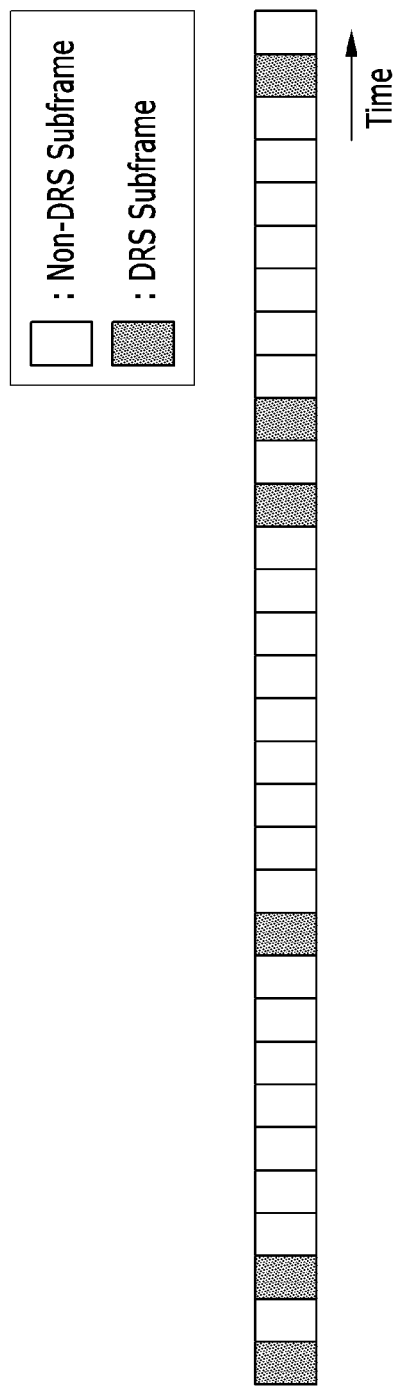
FIG. 3 is a diagram illustrating a DRS subframe of a serving cell.
Figure 4:
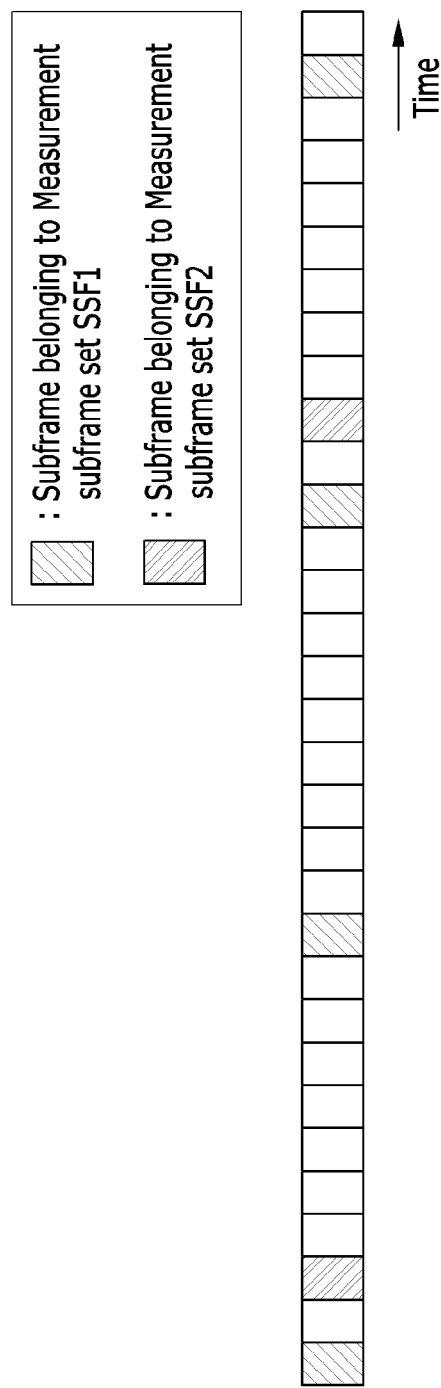
FIG. 4 is a diagram illustrating a measurement subframe of a terminal corresponding to the DRS subframe of FIG. 3.

The second method will be described in detail with reference to FIGS. 3 and 4. FIG. 3 is a diagram illustrating a DRS subframe of the serving cell 400. Specifically, FIG. 3 represents a Downlink (DL) subframe of the serving cell 400. FIG. 4 is a diagram illustrating a measurement subframe of the terminal 100 corresponding to the DRS subframe of FIG. 3. Specifically, FIG. 4 represents a DL subframe of the terminal 100.

When adjacent cells (e.g., a macrocell and a small cell) operating in the same frequency have an ABS pattern, the serving cell 400 of the terminal 100 may set a measurement subframe set SSF1 and SSF2, as shown in FIG. 4. The measurement subframe set SSF1 is a set of subframes that are set to an ABS by adjacent cells. When performing D-RRM measurement in the measurement subframe set SSF1, the terminal 100 may perform D-RRM measurement/report in an interference condition in which interference of the adjacent cells does not exist. The measurement subframe set SSF2 is a set of subframes that are set to non-ABS by adjacent cells. When the terminal 100 performs D-RRM measurement in the measurement subframe set SSF2, the terminal 100 may perform D-RRM measurement/report in an interference condition including interference of the adjacent cells.

The serving cell 400 or the adjacent cell may set a subframe belonging to measurement subframe sets SSF1 and SSF2 to a DRS subframe and set the remaining subframes to a non-DRS subframe, as shown in FIG. 3. Specifically, the serving cell 400 or the adjacent cell may transmit a DRS in an entire subframe belonging to measurement subframe sets SSF1 and SSF2. Alternatively, the serving cell 400 or the adjacent cell may transmit a DRS in a portion of subframes belonging to measurement subframe sets SSF1 and SSF2. The terminal 100 performs D-RRM measurement/report in the measurement subframe set SSF1 and performs D-RRM measurement/report in the measurement subframe set SSF2. The terminal 100 may perform a different D-RRM measurement/report in each measurement subframe set SSF1 and SSF2. Each measurement subframe set SSF1 and SSF2 of FIG. 4 may be expressed through a bit map that is defined in TS 36.331.

3. Method of Measuring RRM in an Inter-Frequency (Hereinafter, 'Inter-Frequency Measurement Method')

Figure 5:
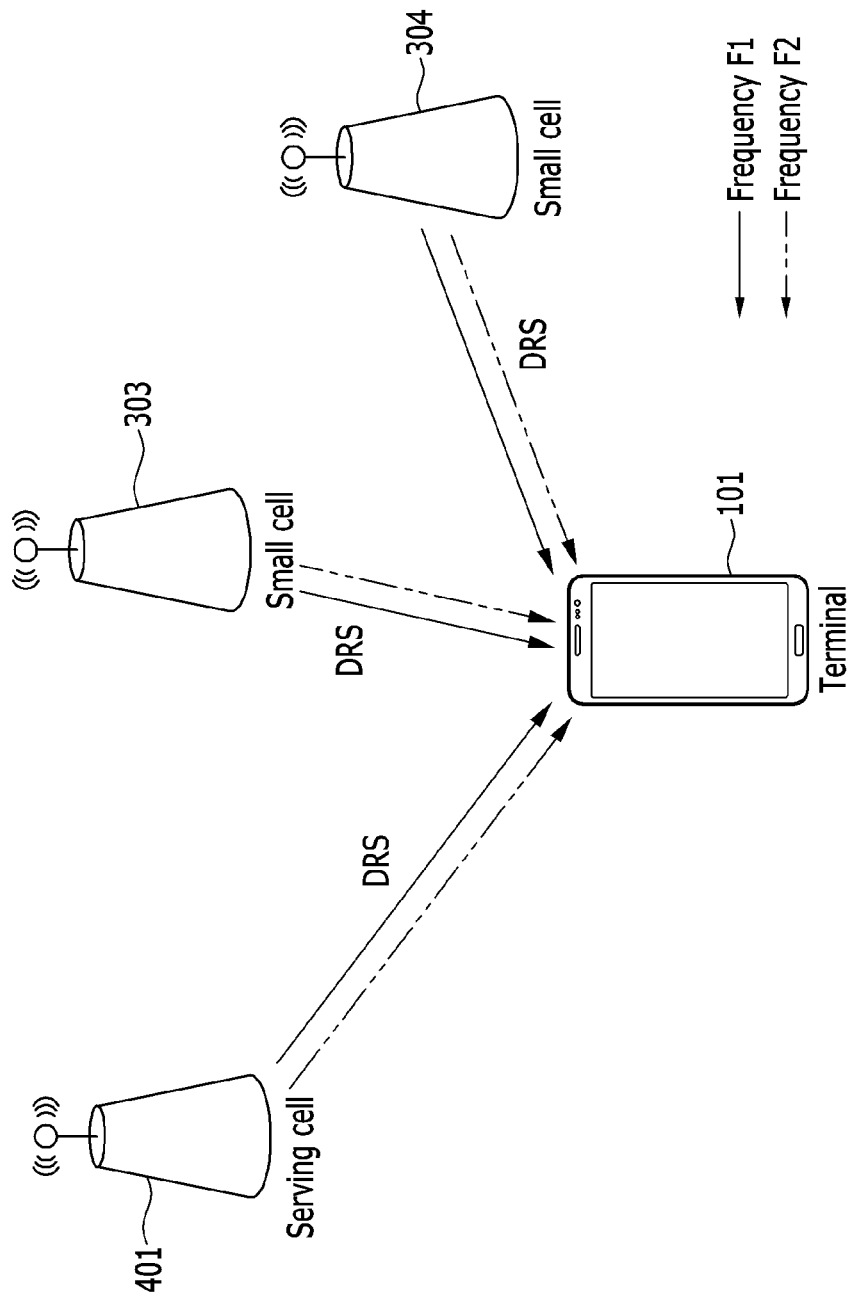
FIG. 5 is a diagram illustrating a case in which adjacent small cells use a frequency different from a serving frequency of a serving cell.

RRM measurement of an inter-frequency is performed in consideration of an environment of FIG. 5.

FIG. 5 is a diagram illustrating a case in which an adjacent small cell 304 uses a frequency F2 different from a serving frequency F1 of a serving cell 401 of a terminal 101. In FIG. 5, for convenience of description, a frequency in which the terminal 101 communicates with the serving cell 401 is referred to as a frequency F1, and another frequency that the terminal 101 observes is referred to as a frequency F2.

The serving cell 401 may be a macrocell or a small cell. The serving cell 401 may transmit a DRS using the serving frequency F1 and may transmit another signal instead of a DRS using the frequency F2 that is different from the frequency F1. A small cell 303 adjacent to the terminal 101 among a plurality of small cells may transmit a DRS using the frequency F1 and may transmit another signal instead of a DRS using the frequency F2. The small cell 304 adjacent to the terminal 101 among a plurality of small cells may transmit a DRS using the frequency F2 and may transmit another signal instead of a DRS using the frequency F1.

A method in which the terminal 101 measures D-RRM of the small cell 304 operating in the frequency F2 that is different from the serving frequency F1 of the serving cell 401 may be different according to a receiving capability of the terminal.

When the terminal 101 has a receiver for each of the frequency F1 and the frequency F2, the serving cell 401 sets D-RRM measurement of respective frequencies F1 and F2 to the terminal 101. The terminal measures D-RRM (e.g., D-RRM of the serving cell 401, D-RRM of the small cell 303) of the frequency F1 and D-RRM (e.g., D-RRM of the small cell 304) of the frequency F2 according to the above-described intra-frequency measurement method and reports a result thereof to the serving cell 401. In the frequency F2, when a measurement subframe and a non-measurement subframe are divided, the serving cell 401 should perform RRC signaling of a measurement subframe pattern for the frequency F2 to the terminal 101. That is, an Information Element (IE) for setting a measurement subframe pattern includes all information about the frequency F1 or a measurement subframe pattern that is set by the adjacent cell 303 of the Pcell and the frequency F2 or a measurement subframe pattern that is set by the adjacent cell 304 of a Secondary cell (Scell).

When the receiver that the terminal 101 has cannot perform electric wave reception with sufficient accuracy (e.g., accuracy of a threshold value or more) in the frequency F1 and the frequency F2, the serving cell 401 sets an MG to the terminal 101, and the terminal 101 measures D-RRM of the frequency F2 in MG and reports a result thereof to the serving cell 401 according to an inter-frequency measurement method.

In order to perform D-RSRP measurement, the terminal 101 acquires time synchronization and frequency synchronization in the frequency F2 and detects a sequence of a DRS based on the acquired synchronization. The terminal 101 performs L3 filtering of a receiving intensity value of the detected sequence and determines a result value in which L3 filtering is performed to a D-RSRP value.

In order to perform D-RSRQ measurement, the terminal 101 acquires time synchronization and frequency synchronization from a synchronization signal or a DRS and induces D-RSRP based on the acquired synchronization. Further, the terminal 101 induces a D-RSSI using an OFDM symbol of a subframe that is used for inducing D-RSRP. The terminal 101 determines a D-RSRQ value based on D-RSRP and a D-RSSI.

A method in which the terminal 101 acquires synchronization includes a method of acquiring synchronization from a Primary Synchronization Signal (PSS) or a Secondary Synchronization Signal (SSS), a method of directly acquiring synchronization from a DRS, or a method in which the terminal 101 receives synchronization information through RRC signaling or Medium Access Control (MAC) signaling from the serving cell 401.

3.1. Method in which the Terminal 101 Measures D-RRM Based on MG Pattern

When the serving cell 401 sets an MG pattern to the terminal 101, the terminal 101 may distinguish a subframe belonging to MG according to the MG pattern. The terminal 101 performs RRM measurement of another frequency in a subframe belonging to MG. Because the terminal 101 previously receives and knows a location of a DRS subframe that is transmitted in another frequency from the serving cell 401, the terminal 101 measures D-RRM in the DRS subframe of subframes belonging to an MG. In the other frequency in which the terminal 101 measures, when cells control transmission power with an intercell interference coordination (ICIC) method, it is preferable for the terminal 101 to separately measure D-RRM, as in an Rel-11 specification. For this reason, the serving cell 401 performs RRC signaling of a measurement subframe pattern to the terminal 101.

When the terminal 101 follows a Rel-11 specification, if a period of a DRS corresponds to several hundred milliseconds, it is difficult for the terminal 101 to perform D-RRM measurement/report. In the FDD system, in order to express a measurement subframe pattern of a 200 ms unit (period), 200 bits are required. However, when a measurement subframe pattern is formed with 40 bits in an FDD system and is formed with maximum 70 bits in a TDD system, it is impossible to express a DRS subframe pattern (representing a DRS subframe) having a period of 200 ms.

In order to solve such a problem, the serving cell 401 may select at least one of a plurality of measurement subframe patterns having a random length. The maximum number of bits expressing a measurement subframe pattern may be determined based on a period of a DRS and an MG Repetition Period (MGRP). MGRP represents a period in which an MG is repeated.

The reason why a period of a DRS is a factor in determining a length of a measurement subframe pattern is that the terminal 101 sets a subframe for measuring D-RSRP or a D-RSRQ according to a period in which the serving cell 401 or small cells 303 and 304 transmit a DRS.

The reason why MGRP is a factor in determining a length of a measurement subframe pattern is to enable terminals that set another frequency to a serving frequency to smoothly perform D-RRM measurement/report. For example, it is assumed that other terminals (e.g., the first terminal and the second terminal) instead of the terminal 101 are RRC connected to the serving cell 401 that transmits a DRS using the frequency F1 in the frequency F2. When the first terminal has all receivers for each of the frequency F1 and the frequency F2, the first terminal may perform D-RRM measurement/report without an MG. When the second terminal has only the receiver of the frequency F2, the serving cell 401 of the second terminal sets an MG to the second terminal. The second terminal may receive a DRS of the frequency F1 (DRS transmitted in the frequency F1) within a subframe that is included in an MG, measure D-RRM based on the received DRS, and report a measured result to the serving cell 401. Therefore, the serving cell 401 may set a length of a measurement subframe pattern in consideration of MGRP, which is a period of an MG.

Specifically, when T1 is a period of a DRS and L is a length of a measurement subframe pattern, the serving cell 401 may set a least common multiple (MGRP) T1 to L. However, when L is too long, an RRC signaling burden is large and thus the serving cell 401 may set T1 to a submultiple of MGRP or may set MGRP to a submultiple of T1. Particularly, when the terminal 101 measures an inter-frequency, it is preferable to always perform RRM measurement in a subframe belonging to an MG, and thus the serving cell 401 sets MGRP and T1 so that the MGRP becomes a submultiple of T1. In such a case, because L=max (T1, MGRP), L does not have a large value.

When an MG is set to the terminal 101, the terminal 101 may distinguish a DRS subframe of an ABS set and a DRS subframe of a non-ABS set among subframes that are included in the MG.

3.2. Method of Setting MG Pattern

When the terminal 101 performs other frequency measurement according to an MG pattern that receives setting from the serving cell 401 thereof, the terminal 101 measures a DRS using some of subframes that are included in the MG. Measurement of D-RRM includes measurement of a DRS.

The serving cell 401 should know a subframe in which another small cell 304 transmits a DRS using the frequency F2 among subframes belonging to an MG. Therefore, the small cells 303 and 304 may transfer a period of a DRS thereof and subframe offset information of a DRS to adjacent cells through backhaul. Further, the serving cell 401 may signal a measurement subframe pattern in a bit map form to the terminal 101 so that the terminal 101 may distinguish a measurement subframe and a non-measurement subframe of subframes belonging to an MG. For example, when a length of an MG (MGL) is 6 ms, the serving cell 401 may perform RRC signaling of a bit map of a length 6 representing a measurement subframe pattern for the MG to the terminal 101.

When the number of MG patterns that the serving cell 401 may set for the terminal 101 is limited to one, even if the number of frequencies in which the terminal 101 should measure D-RRM is plural, the serving cell 401 sets one MG pattern to the terminal 101.

When the number of other frequencies in which the terminal 101 should measure D-RRM is 1, the terminal 101 measures RRM of another frequency (e.g., F2) using one MG pattern and reports an RRM measurement result to the serving cell 401. Specifically, the terminal 101 may tune a Radio Frequency (RF) circuit to another frequency F2 in MG corresponding to one MG pattern, measure a PSS or an SSS (hereinafter, a 'PSS or an SSS' is referred to as a PSS/SSS'), and perform RRM measurement. Therefore, the terminal 101 may measure only one frequency in one MG. In this process, several tens of subframes to several hundreds of subframes may be required on a frequency basis according to setting of L1 filtering or L3 filtering. When signaling in which the serving cell 401 can regulate operation within an MG to the terminal 101 does not exist, it is necessary to implement a function in which the terminal 101 can observe a plurality of frequencies in the terminal 101.

A case in which the terminal 101 performs RRM measurement of a plurality of other frequencies based on one MG pattern will be described in detail with reference to FIG. 6.

Figure 6:
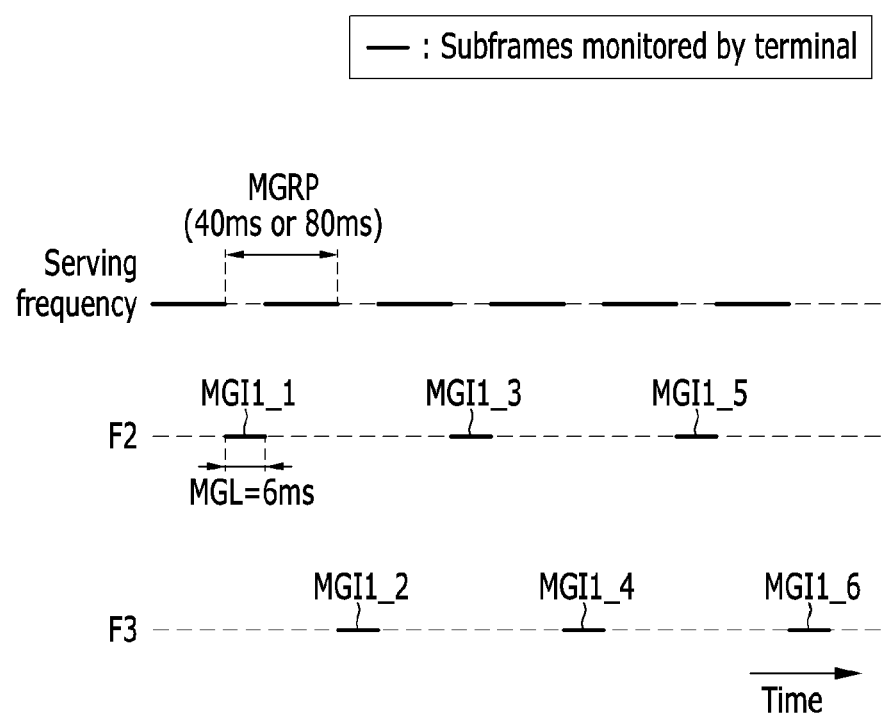
FIG. 6 is a diagram illustrating a case in which a terminal measures RRM in a plurality of frequencies different from a serving frequency based on one MG pattern.

FIG. 6 is a diagram illustrating a case in which the terminal 101 measures RRM in a plurality of frequencies F2 and F3 that are different from the serving frequency F1 based on one MG pattern. Specifically, FIG. 6 represents a subframe that is monitored by the terminal 101 in the serving frequency F1, a subframe that is monitored by the terminal 101 in the frequency F2, and a subframe that is monitored by the terminal 101 in the frequency F3.

When measuring RRM of a plurality of other frequencies F2 and F3, in order to measure other frequencies F2 and F3, the terminal 101 uses MG instances MGI1_1-MGI1_6 corresponding to one MG pattern. Setting of an MG pattern includes setting of an MG. When one MG is set, MG instances MGI1_1-MGI1_6 are periodically (repeatedly) represented. MG instances MGI1_1-MGI1_6 include at least one subframe according to an MGL. In FIG. 6, a case in which MGRP is 40 ms or 80 ms and in which an MGL is 6 ms is illustrated, and MG instances MGI1_1-MGI1_6 include 6 subframes. For example, the terminal 101 observes the frequency F2 in one MG instance MGI1_1 and observes the frequency F3 in another MG instance MGI1_2. That is, the terminal 101 uses MG instances MGI1_1, MGI1_3, and MGI1_5 in order to observe the frequency F2, and uses MG instances MGI1_2, MGI1_4, and MGI1_6 in order to observe the frequency F3. As shown in FIG. 6, when the terminal 101 measures two other frequencies F2 and F3 based on one MG pattern, in order to acquire sufficient measurement accuracy, the terminal 101 should observe two other frequencies F2 and F3 using subframes of the double number and thus a measurement speed becomes slow twice.

Because a consuming time when a small cell supporting Long Term Evolution (LTE) Release-12 (Rel-12) converts a state thereof is several tens of milliseconds, while the terminal performs RRM measurement, a state of a small cell may be changed. In such a case, because the network should be able to again convert a state of a small cell according to an RRM measurement result of the terminal, separate time delay occurs. Therefore, it is preferable that the terminal measures RRM of more frequencies with subframes of a smaller number. As a method for this purpose, in order to set simultaneously (or together) a plurality of MG patterns through one IE, a new IE may be introduced. That is, one IE may include a plurality of MG configuration information. Specifically, in the IE, MGRP of each MG may be equally set, and subframe offset of each MG may be differently set. Alternatively, in the IE, one MGRP, one subframe offset of the MG, and only the number of the MG is set (included), and the terminal 101 may assume a subframe offset difference between MGs to an MGL and determine an MG based on MG configuration information of the IE. Here, the MGL may be 6 ms or may be a newly defined value (a value other than 6 ms) for flickering/lighting of the small cell. In MG configuration information of the IE, a frequency in which the terminal 101 should measure may be explicitly designated (set). That is, information about a measuring frequency may be included in MG configuration information of the IE. In the IE, an MGL of each MG may be equally or differently set. A case in which the terminal 101 measures D-RRM of a plurality of other frequencies F2 and F3 based on a plurality of MG patterns will be described with reference to FIG. 7.

Figure 7:
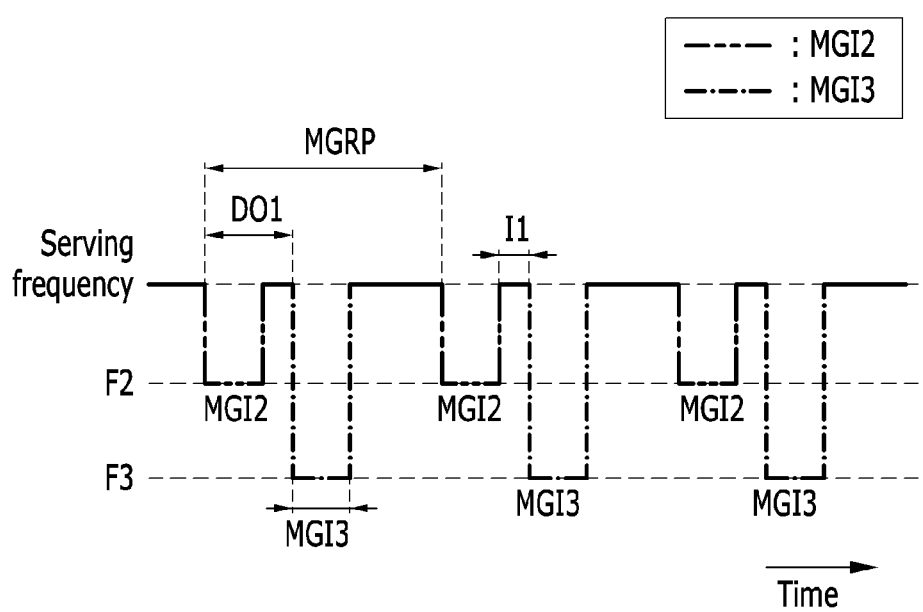
FIG. 7 is a diagram illustrating a case in which a terminal measures RRM in a frequency that is different from a serving frequency based on a plurality of MG patterns.

FIG. 7 is a diagram illustrating a case in which the terminal 101 measures RRM in frequencies F2 and F3 different from the serving frequency F1 based on a plurality of MG patterns. Specifically, FIG. 7 illustrates a case in which the serving cell 401 of the terminal 101 sets a first MG pattern for another frequency F2 and a second MG pattern for another frequency F3 and in which the terminal 101 measures D-RRM of two other frequencies F2 and F3 using the first and second MG patterns. FIG. 7 illustrates a case in which MGLs of first and second MG patterns are equally set and MGRPs of first and second MG patterns are equally set and in which a subframe offset difference DO1 between first and second MG patterns is larger than an MGL.

The terminal 101, having communicated in the serving frequency F1 receives setting of the first MG pattern and the second MG pattern from the serving cell 401 through one IE. The terminal 101 converts a frequency of the receiver to the measuring frequency F2 in an MG instance MGI2 corresponding to the first MG pattern and measures D-RRM of the frequency F2. The terminal 101 converts a frequency of the receiver to the serving frequency F1 after the MG instance MGI2 and measures D-RRM of the serving frequency F1. The terminal 101 converts a frequency of the receiver to a measuring frequency F3 in an MG instance MGI3 corresponding to a second MG pattern and measures D-RRM of the frequency F3. The terminal 101 converts a frequency of the receiver to the serving frequency F1 after the MG instance MGI3 and measures D-RRM of the serving frequency F1. The terminal 101 may repeat the process. One MG instance MGI2 and one MG instance MGI3 may be represented within one MGRP.

In FIG. 7, because a difference DO1 between subframe offset of a first MG pattern and subframe offset of a second MG pattern is larger than an MGL, the terminal 101 may not receive scheduling permission of a subframe existing in a segment 11 between an MG instance MGI2 and an MG instance MGI3 from the serving cell 401. A case in which the serving cell 401 sets subframe offset of first and second MG patterns so that the segment 11 between the MG instance MGI2 and the MG instance MGI3 does not exist will be described with reference to FIG. 8.

Figure 8:
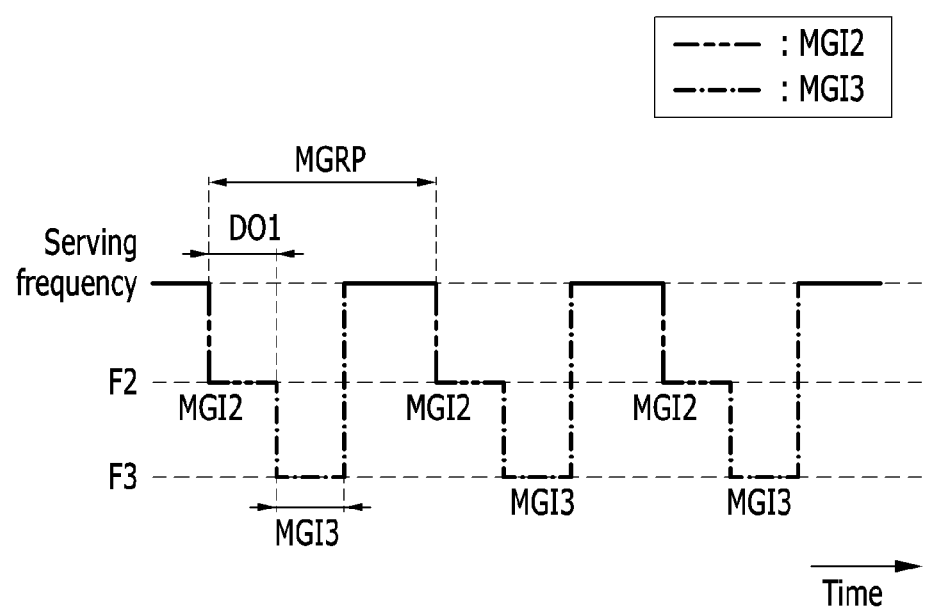
FIG. 8 is a diagram illustrating a case in which a terminal measures RRM in a frequency that is different from a serving frequency in a case in which subframe offset of a second MG pattern is set to a value that adds an MGL to subframe offset of a first MG pattern.

FIG. 8 is a diagram illustrating a case in which the terminal 101 measures RRM in the frequencies F2 and F3 different from the serving frequency F1 in a case in which subframe offset of a second MG pattern is set to a value that adds an MGL to a subframe offset of a first MG pattern.

In order to reduce the number of Uplink (UL) or DL subframes that the terminal 101 does not use, the serving cell 401 may appropriately adjust subframe offset of first and second MG patterns. Specifically, the serving cell 401 may set subframe offset of the second MG pattern to a value that adds an MGL to subframe offset of the first MG pattern. In this case, a difference DO1 between subframe offset of the first MG pattern and subframe offset of the second MG pattern becomes an MGL. Thereby, the number of subframes that the terminal 101 cannot use can be minimized.

The serving cell 401 of the terminal 101 should notify the terminal 101 of a measurement subframe pattern for each MG pattern so that the terminal 101 distinguishes a measurement subframe and a non-measurement subframe among subframes that are included in each of the MG instances MGI2 and MGI3. Specifically, in order to notify the terminal 101 of a measurement subframe pattern for each MG pattern, the serving cell 401 may set bit maps of the same number as that of MGLs of each MG pattern to the terminal 101. For example, when MGLs of the first MG pattern and the second MG pattern are 6 ms, a bit map (hereinafter, a 'first bit map') representing a measurement subframe pattern for the first MG pattern may be formed with 6 bits, and a bit map (hereinafter, a 'second bit map') representing a measurement subframe pattern for the second MG pattern may be formed with 6 bits. For example, when the first bit map is 001100, third and fourth subframes of 6 subframes belonging to the MG instance MGI2 are measurement subframes and the remaining subframes are non-measurement subframes. The terminal 101 measures D-RRM only in a measurement subframe belonging to the MG instance MGI2, and it is unnecessary for the terminal 101 to measure D-RRM in a non-measurement subframe belonging to the MG instance MGI2. Similarly, when the second bit map is 101001, first, third, and sixth subframes of 6 subframes belonging to an MG instance MGI3 are measurement subframes and the remaining subframes are non-measurement subframes.

The terminal 101 may receive setting of a measurement subframe pattern for the serving frequency F1 as well as a measurement subframe pattern for each MG pattern from the serving cell 401.

The serving cell 401 may set an MG pattern for a measuring frequency according to a reception capability of the terminal 101. This will be described with reference to FIGS. 9 to 12. Further, a method of adjusting an MGL (a method of increasing an MGL and a method of reducing an MGL) without fixing an MGL to a previously defined value (e.g., 6 ms) will be described.

First, a method of increasing an MGL will be described.

Figure 9:
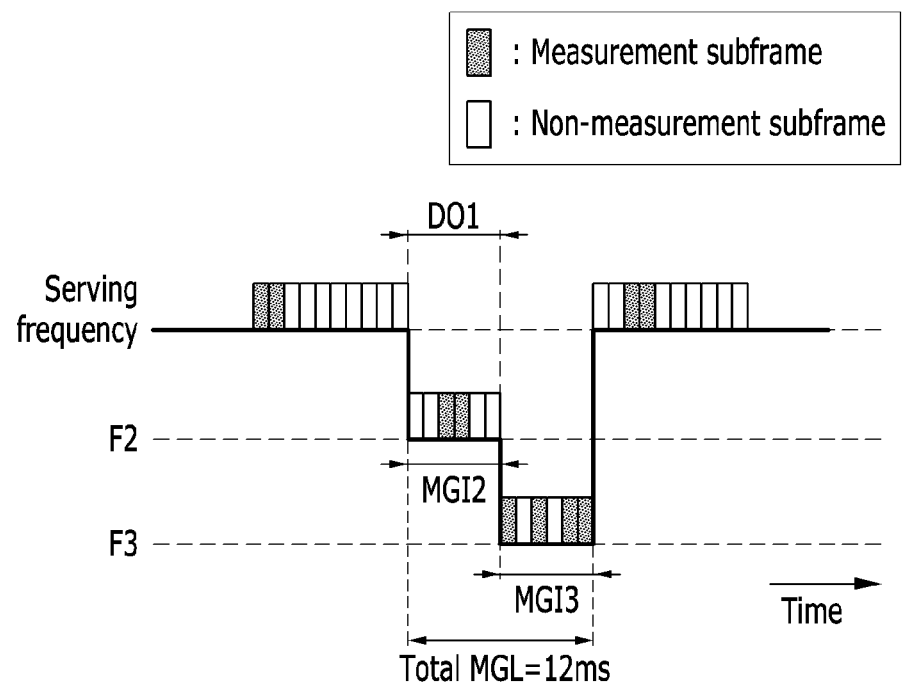
FIG. 9 is a diagram illustrating a case in which two MG patterns are set to a serving frequency so that a terminal measures RRM of two other frequencies that are different from the serving frequency.

FIG. 9 is a diagram illustrating a case in which two MG patterns are set to the serving frequency F1 so that the terminal 101 measures RRM of two other frequencies F2 and F3 that are different from the serving frequency F1. Specifically, in FIG. 9, it is assumed that the terminal 101 has only one receiver.

The serving cell 401 may set a first MG pattern for the frequency F2 and a second MG pattern for the frequency F3 in the serving frequency F1 (based on the frequency F1) so that the terminal 101 measures the frequency F2 and the frequency F3. Specifically, the serving cell 401 may set a first MG pattern and a second MG pattern so that a subframe offset difference DO1 of the first MG pattern and the second MG pattern becomes an MGL of the first MG pattern. When an MGL of each MG pattern is 6 ms, a total MGL according to the first MG pattern and the second MG pattern is 12 ms (=6 ms+6 ms). An MG instance MGI2 corresponding to the first MG pattern may include 6 subframes, and an MG instance MGI3 corresponding to the second MG pattern may include 6 subframes. The serving cell 401 may set a measurement subframe pattern for each MG pattern. For example, third and fourth subframes of 6 subframes that are included in the MG instance MGI2 may be set to a measurement subframe, and the remaining subframes may be set to a non-measurement subframe. Second and fourth subframes of 6 subframes that are included in the MG instance MGI3 may be set to a non-measurement subframe, and the remaining subframes may be set to a measurement subframe. The serving cell 401 may set a measurement subframe pattern for the serving frequency F1. For example, 10 subframes before the MG instance MGI2 and 10 subframes after the MG instance MGI3 may correspond to a measurement subframe pattern for the serving frequency F1. First and second subframes of 10 subframes before the MG instance MGI2 may be set to a measurement subframe, and the remaining subframes may be set to a non-measurement subframe. Third and fourth subframes of 10 subframes after the MG instance MGI3 may be set to a measurement subframe, and the remaining subframes may be set to a non-measurement subframe.

As shown in FIG. 9, as the serving cell 401 sets two MG patterns, a total MGL becomes 12 ms. From a viewpoint of the terminal 101, it is regarded as an MGL that is increased twice. By such a method, the serving cell 401 may set an MG pattern like an MGL that is set to a larger value than a previously defined value (e.g., 6 ms).

Figure 10:
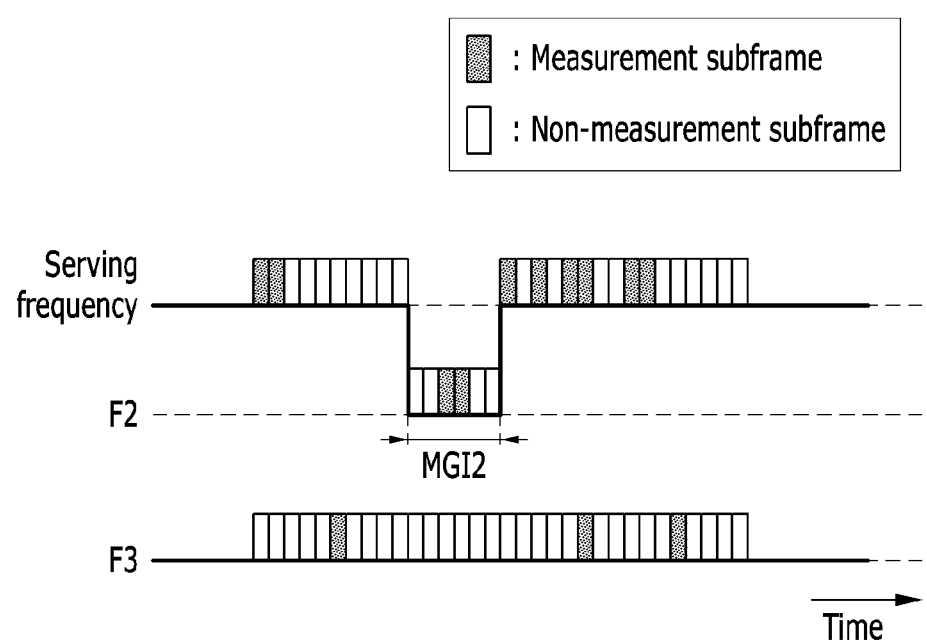
FIG. 10 is a diagram illustrating a case in which one MG pattern is set to a serving frequency so that a terminal measures RRM of two other frequencies that are different from the serving frequency.

FIG. 10 is a diagram illustrating a case in which one MG pattern is set to a serving frequency F1 so that the terminal 101 measures RRM of two other frequencies F2 and F3 different from the serving frequency F1. In FIG. 10, it is assumed that the terminal 101 has only two receivers.

The serving cell 401 may set a first MG pattern for the measuring frequency F2 in the serving frequency F1 and may not set a second MG pattern for the measuring frequency F3. The terminal 101 may measure D-RRM of the frequency F2 in the MG instance MGI2 corresponding to the first MG pattern. For example, when an MGL of the first MG pattern is 6 ms, the MG instance MGI2 includes 6 subframes. Third and fourth subframes of 6 subframes that are included in the MG instance MGI2 may be set to a measurement subframe, and the remaining subframes may be set to a non-measurement subframe. The terminal 101 may measure D-RRM of the frequency F2 in third and fourth subframes among subframes of the MG instance MGI2.

The serving cell 401 may set a measurement subframe pattern for the serving frequency F1. For example, 10 subframes before the MG instance MGI2 and 16 subframes after the MG instance MGI2 may correspond to a measurement subframe pattern for the serving frequency F1. First and second subframes of 10 subframes before the MG instance MGI2 may be set to a measurement subframe, and the remaining subframes may be set to a non-measurement subframe. The terminal 101 may measure D-RRM of the frequency F1 in the first and second subframes of 10 subframes before the MG instance MGI2. First, third, fifth, sixth, ninth, and tenth subframes of 16 subframes after the MG instance MGI2 may be set to a measurement subframe, and the remaining subframes may be set to a non-measurement subframe. The terminal 101 may measure D-RRM of the frequency F1 in the first, third, fifth, sixth, ninth, and tenth subframes of 16 subframes after the MG instance MGI2.

The serving cell 401 may set a measurement subframe pattern for the frequency F3. For example, a measurement subframe pattern for the frequency F3 may correspond to 32 subframes. Sixth, 22nd, and 28th subframes of 32 subframes may be set to a measurement subframe, and the remaining subframes may be set to a non-measurement subframe. The terminal 101 may measure D-RRM of the frequency F3 in the sixth, 22nd, and 28th subframes of 32 subframes.

Figure 11:
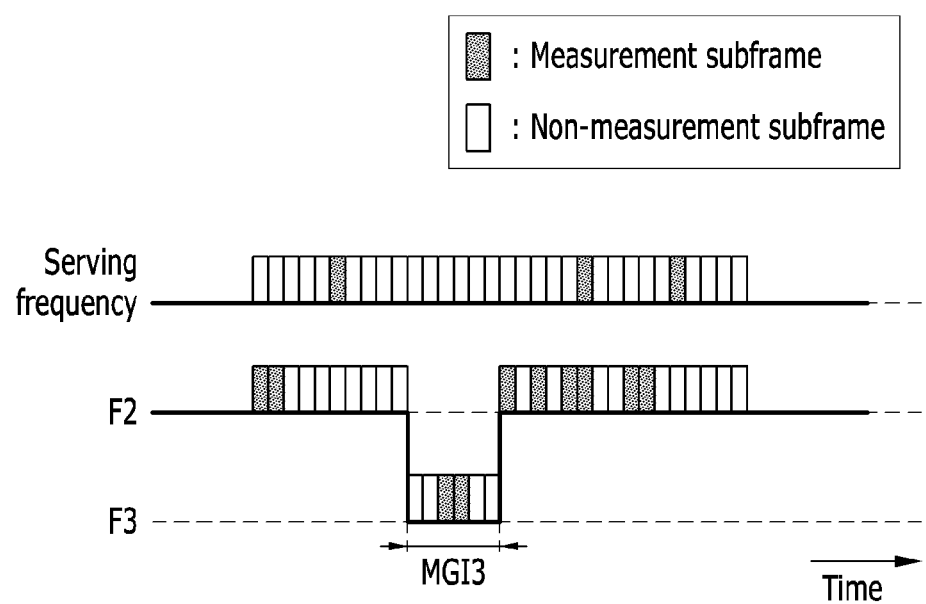
FIG. 11 is a diagram illustrating a case in which one MG pattern is set to another frequency so that a terminal measures RRM of two other frequencies that are different from the serving frequency.

FIG. 11 is a diagram illustrating a case in which one MG pattern is set to other frequencies F2 and F3 so that the terminal 101 measures RRM of two other frequencies F2 and F3 that are different from the serving frequency F1. In FIG. 11, it is assumed that the terminal 101 has only two receivers.

The serving cell 401 may set a second MG pattern for the measuring frequency F3 in the serving frequency F2 and may not set a first MG pattern for the measuring frequency F2. The terminal 101 may measure D-RRM of the frequency F3 in the MG instance MGI3 corresponding to the second MG pattern. For example, when an MGL of the second MG pattern is 6 ms, the MG instance MGI3 includes 6 subframes. Third and fourth subframes of 6 subframes that are included in the MG instance MGI3 may be set to a measurement subframe, and the remaining subframes may be set to a non-measurement subframe. The terminal 101 may measure D-RRM of the frequency F3 in third and fourth subframes of subframes of the MG instance MGI3.

The serving cell 401 may set a measurement subframe pattern for the serving frequency F1. For example, a measurement subframe pattern for the frequency F1 may correspond to 32 subframes. Sixth, 22nd, and 28th subframes of 32 subframes may be set to a measurement subframe, and the remaining subframes may be set to a non-measurement subframe. The terminal 101 may measure D-RRM of the frequency F1 in the sixth, 22nd, and 28th subframes of 32 subframes.

The serving cell 401 may set a measurement subframe pattern for the frequency F3. For example, 10 subframes before the MG instance MGI3 and 16 subframes after the MG instance MGI3 may correspond to a measurement subframe pattern for the frequency F2. First and second subframes of 10 subframes before the MG instance MGI3 may be set to a measurement subframe, and the remaining subframes may be set to a non-measurement subframe. The terminal 101 may measure D-RRM of the frequency F2 in the first and second subframes of 10 subframes before the MG instance MGI3. First, third, fifth, sixth, ninth, and tenth subframes of 16 subframes after the MG instance MGI3 may be set to a measurement subframe, and the remaining subframes may be set to a non-measurement subframe. The terminal 101 may measure D-RRM of the frequency F2 in the first, third, fifth, sixth, ninth, and tenth subframes of 16 subframes after the MG instance MGI3.

Figure 12:
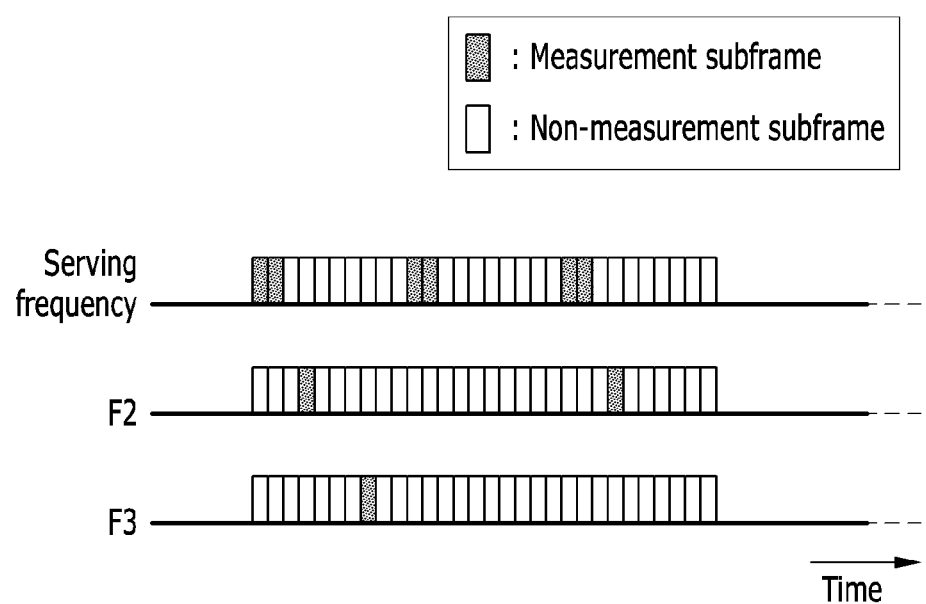
FIG. 12 is a diagram illustrating a case in which a terminal measures RRM of two other frequencies that are different from the serving frequency without setting an MG pattern.

FIG. 12 is a diagram illustrating a case in which a terminal 101 measures RRM of two other frequencies F2 and F3 that are different from a serving frequency F1 without setting of an MG pattern. In FIG. 12, it is assumed that the terminal 101 has three receivers.

Because the terminal 101 has three receivers, the serving cell 401 may not set an MG pattern for the measuring frequencies F2 and F3. The terminal 101 independently measures D-RRM of each of frequencies F1, F2, and F3 without an MG pattern.

The serving cell 401 may set a measurement subframe pattern for the frequency F1. For example, a measurement subframe pattern for the frequency F1 may correspond to 30 subframes. First, second, 11th, 12th, 21st, and 22nd subframes of 30 subframes may be set to a measurement subframe, and the remaining subframes may be set to a non-measurement subframe. The terminal 101 may measure D-RRM of the frequency F1 in first, second, 11th, 12th, 21st, and 22nd subframes of 30 subframes.

The serving cell 401 may set a measurement subframe pattern for the frequency F2. For example, a measurement subframe pattern for the frequency F2 may correspond to 30 subframes. Fourth and 24th subframes of 30 subframes may be set to a measurement subframe, and the remaining subframes may be set to a non-measurement subframe. The terminal 101 may measure D-RRM of the frequency F2 in fourth and 24th subframes of 30 subframes.

The serving cell 401 may set a measurement subframe pattern for the frequency F3. For example, a measurement subframe pattern for the frequency F3 may correspond to 30 subframes. An eighth subframe of 30 subframes may be set to a measurement subframe, and the remaining subframes may be set to a non-measurement subframe. The terminal 101 may measure D-RRM of the frequency F3 in the eighth subframe of 30 subframes.

As shown in FIGS. 9 to 12, the serving cell 401 may set an effective measurement subframe pattern for the serving frequency F1 to the terminal 101 and set a measurement subframe pattern for each of other frequencies F2 and F3 to the terminal 101. The serving cell 401 may transfer a measurement subframe pattern necessary for measuring other frequency to the terminal 101 according to a reception capability of the terminal 101.

Even if the terminal 101 uses only a single DRS subframe or a few DRS subframes for D-RSRP or D-RSRQ measurement, when the terminal 101 can obtain enough accuracy, in order to identify or measure an adjacent cell of the serving frequency F1 and adjacent cells of other observing frequency using a DRS, the terminal 101 may use a single MG pattern or a few MG patterns. In such a case, when the serving cell 401 maintains an MGL to 6 ms, the terminal 101 should be able to perform D-RSRP or D-RSRQ measurement of a plurality of observing frequencies with enough accuracy within the MGL. When the terminal 101 observes other frequencies F2 and F3 for a time longer than an MGL, transmission/reception of data transmission and retransmission cannot be performed in the serving frequency F1 and thus the serving cell 401 cannot perform scheduling at about an MG. Thereby, because a transmitting amount performance of the terminal 101 may be reduced, it is preferable that the serving cell 401 does not set an MGL to a value larger than 6 ms. Specifically, it is preferable that the serving cell 401 sets an MG pattern so that a total MGL according to a plurality of MG patterns is not larger than 6 ms. In such a case, a method of reducing an MGL may be considered.

A method of reducing an MGL will be described.

Even if the terminal 101 performs D-RRM using subframes of a number smaller than 6, when the terminal 101 can perform D-RRM measurement while satisfying sufficient RRM measurement accuracy, it is preferable that the serving cell 401 sets an MGL with a value smaller than 6 ms. Therefore, the serving cell 401 may determine an MGL to a value within 6 ms according to a reception capability of the terminal 101 and transfer information of the determined MGL to the terminal 101. In this case, an MGL of an MG pattern that is set by the serving cell 401 may have various values, and a length of a bit map representing a measurement subframe pattern for the MG pattern may be the same as an MGL. A measurement subframe pattern for the MG pattern may be determined according to transmitting subframe offset and a transmission period of a DRS in which peripheral cells of the serving cell 401 transmit.

When the terminal 101 moves in a low speed, a wireless channel environment does not largely change according to time. In such a case, because a D-RSRP or D-RSRQ measurement value of the terminal 101 does not largely change for a long time, even if MGRP has a considerably large value, the D-RSRP or D-RSRQ measurement value is enough for adjacent cell identification or adjacent cell measurement. In an aspect of a power consumption amount of the terminal 101, it is preferable that MGRP has a value larger than 40 ms or 80 ms. It is preferable that various MG patterns are defined. It is preferable to introduce MGRP having a maximum time necessary for identifying an adjacent cell that is defined in TS 36.133. Therefore, it is preferable that various MG patterns including a new MGL having a value other than 6 ms and MGRP having a value other than 40 ms and 80 ms are defined.

The serving cell 401 may set an MGL to 6 ms or a value different from 6 ms according to a reception capability of the terminal 101 or the number of frequencies in which the terminal 101 measures, and may set MGRP to 40 ms, 80 ms, or a value different from 40 ms and 80 ms. For example, when the number of other frequencies in which the terminal 101 should measure is 1 and when only one MG pattern is set for measuring other frequency, it is assumed that an MGL and MGRP of one MG pattern are MGL1 and MGRP1, respectively. When the number of other frequencies in which the terminal 101 should measure is M and when MG patterns of the M number are set to measure other frequencies of the M number, it is assumed that an MGL and MG RP of each MG pattern are MGL2_1 and MGRP2_1, MGL2_2 and MGRP2_2, . . . , MGL2_M and MGRP2_M, respectively. The serving cell 401 may set MG patterns of the M number to the terminal 101 so that MGL2_1+ MGL2_2+ . . . + MGL2_M≤MGL1. For example, when MGL1=6 ms, when the number of other frequencies F2 and F3 in which the terminal 101 should measure is two, and when the terminal 101 has only the receiver for the serving frequency F1, the serving cell 401 may set two MG patterns (the first MG pattern and second MG pattern) to the terminal 101. In this case, the serving cell 401 may set an MGL (MGL2_1, e.g., 3 ms) of the first MG pattern and an MGL (MGL2_2, e.g., 3 ms) of the second MG pattern so that the sum of an MGL (MGL2_1) of the first MG pattern and an MGL (MGL2_2) of the second MG pattern is equal to or smaller than 6 ms. In this case, the serving cell 401 may set MGRP (MGRP2_1) of the first MG pattern and MGRP (MGRP2_2) of the second MG pattern to the same value as MGRP1 (e.g., 40 ms or 80 ms).

Alternatively, the serving cell 401 may set MGRP (MGRP2_1) of the first MG pattern and MGRP (MGRP2_2) of the second MG pattern to a value that is different from MGRP1. For example, the serving cell 401 may set MGRP (MGRP2_1) of the first MG pattern so that a ratio of MGL2_1/MGRP2_1 is the same ratio as that of MGL1/ MGRP1. A ratio of MGL1/MGRP1 may be 0.15 (=6 ms/40 ms) or 0.075 (=6 ms/80 ms). When MGL1=6 ms, MGRP1=40 ms, and an MGL (MGL2_1) of the first MG pattern is set to 3 ms, the serving cell 401 may set MGRP (MGRP2_1) of the first MG pattern to 20 ms. When MGL1=6 ms, MGRP1=80 ms, and an MGL (MGL2_1) of the first MG pattern is set to 3 ms, the serving cell 401 may set MGRP (MGRP2_1) of the first MG pattern to 40 ms. Similarly, the serving cell 401 may set MGRP (MGRP2_2) of the second MG pattern so that a ratio of MGL2_2/ MGRP2_2 is the same ratio as that of MGL1/MGRP1.

When MG patterns of the M number are set, an MGL/ MGRP ratio (e.g., MGL2_1/MGRP2_1 ratio, MGL2_2/ MGRP2_2 ratio) that each MG pattern has may be maintained equally to an MGL/MGRP ratio (e.g., MGL1/MGRP1 ratio) that one MG pattern has, when only one MG pattern is set. Thereby, the serving cell 401 may equally maintain a ratio of subframes that cannot schedule the terminal 101.

4. Method of Setting DRS Occasion

A DRS occasion may be formed through temporally consecutive one or a plurality of DRS subframes. A DRS occasion may be at least one consecutive DRS subframe.

4.1. Constituent Elements of DRS Occasion

A DRS may be formed with at least one of a PSS, an SSS, a CRS, and a CSI-RS. The PSS, the SSS, the CRS, and the CSI-RS are physical signals. Hereinafter, it is assumed that the DRS is formed with at least one of the PSS, the SSS, the CRS, and the CSI-RS. Here, a sequence of each of the PSS, the SSS, the CRS, or the CSI-RS is defined in LTE specification TS 36.211. A length of each sequence, a period and an offset of a subframe in which each sequence is transmitted, and resource configuration information for corresponding a sequence to a frequency resource or a time resource may be set by a network.

The terminal acquires approximate synchronization through the PSS and the SSS. By decoding the CRS based on synchronization that is obtained using the PSS and the SSS, the terminal may acquire more detailed synchronization. The terminal may measure RSRP and an RSRQ through the CRS. The terminal may perform CSI feedback through the CSI-RS. The terminal may measure RSRP and an RSRQ through the CSI-RS. When the terminal measures RSRP based on the CSI-RS, the terminal performs coherent demodulation of a sequence of the CSI-RS and measures receiving intensity. A measurement bandwidth of CSI-RSRP (RSRP measured based on the CSI-RS) follows setting of a network.

A DRS subframe may include at least one kind of a PSS sequence, an SSS sequence, a CRS sequence, and a CSI-RS sequence. Temporally consecutive one or a plurality of DRS subframes form one DRS occasion. Configuration information of the DRS occasion includes a duration of DRS subframes. When the small cell is in an active state, control information (e.g., a Physical Downlink Control Channel (PDCCH), an Enhanced PDCCH (EPDCCH)) and data information (e.g., Physical Downlink Shared Channel (PDSCH)) is transmitted in the DRS subframe, and thus in order to distinguish a DRS occasion and a non-DRS occasion, the terminal follows measurement setting of the network. Measurement setting of the network may be largely divided into two cases according to a state of the small cell. For example, the network may be set so that a small cell of an active state does not transmit a DRS occasion and a small cell of a DTx state transmits a DRS occasion. Transmission of a DRS occasion may include transmission of a DRS. Alternatively, the network may be set so that a small cell transmits a DRS regardless of a state (an active state, a DTx state) thereof. Specifically, the network may be set so that a small cell transmits a DRS regardless of a state thereof, but changes a parameter of the DRS occasion according to a state thereof and transmits the DRS occasion. For example, the network may set a DRS occasion period for a small cell of an active state to 40 ms and set a DRS occasion period for a small cell of a DTx state to 160 ms. Alternatively, the network may be set so that a small cell transmits a DRS regardless of a state thereof, but may equally set a parameter of the DRS occasion regardless of a state thereof. For example, the network may equally set a DRS occasion period for a small cell of an active state and a DRS occasion period for a small cell of a DTx state to 40 ms. When a parameter of the DRS occasion is equally set, the terminal cannot determine a state of a cell through the DRS occasion.

An example of a DRS occasion in which the terminal receives will be described with reference to FIGS. 13A and 13B.

Figure 13A:
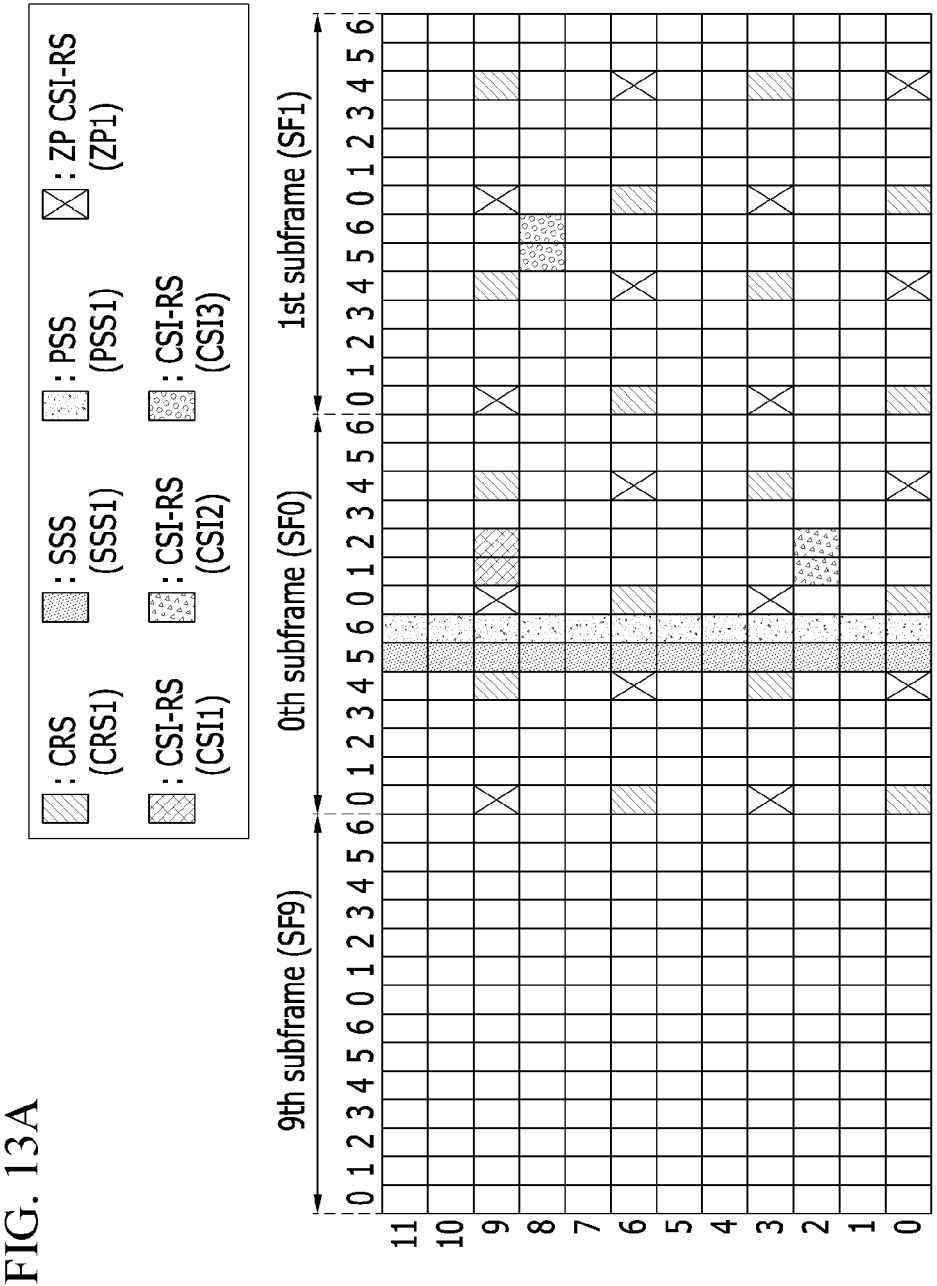

FIGS. 13A and 13B are diagrams illustrating an example of a DRS occasion in which a terminal receives. Specifically, FIGS. 13A and 13B illustrate one DRS occasion from a reception viewpoint of the UE when small cells of a DTx state are synchronized and operate. In FIGS. 13A and 13B, it is assumed that one DRS occasion is formed with three DRS subframes SF0, SF1, and SF2. The DRS subframes SF0 and SF1 of FIG. 13A and the DRS subframe SF2 of FIG. 13B are consecutively formed. For convenience of description, in FIGS. 13A and 13B, the DRS subframe SF1 are overlappingly illustrated.

A 0th subframe SF0 may include a PSS (PSS1), an SSS (SSS1), and a CSI-RS (CSI1 and CSI2). A first subframe SF1 may include a CRS (CRS1) and a CSI-RS (CSI3). A second subframe SF2 may include a CRS (CRS1) and a CSI-RS (CSI4). The subframes SF0, SF1, and SF2 belonging to the DRS occasion may include a Zero Power (ZP) CSI-RS (ZP1). In FIGS. 13A and 13B, because only cells of a DTx state are considered, in a 9th subframe SF9 and a third subframe SF3 that do not belong to the DRS occasion, no signal is transmitted.

A resource for each CSI-RS (CSI1-CSI4) follows resource configuration information that is defined in an LTE Release-10 (Rel-10) specification. In FIGS. 13A and 13B, a case in which each of one cell or one transmission point (TP) sets different Non-ZP (NZP) CSI-RS resources and transmits an NZP CSI-RS is illustrated. That is, NZP CSI-RSs (CSI1-CSI4) are each transmitted by other cells or TPs. Hereinafter, for convenience of description, a 'small cell or TP' is referred to as a 'cell/TP'. As one cell/TP sets a plurality of NZP CSI-RS resources as needed, a synchronization acquisition performance or RRM measurement accuracy of the terminal can be enhanced.

In FIGS. 13A and 13B, it is assumed that each cell/TP uses one port (or two ports) for transmitting/receiving NZP CSI-RS (CSI1-CSI4), NZP CSI-RS (CSI1-CSI4) of each cell/TP has the same period, but subframe offset and a resource setting number of each NZP CSI-RS (CSI1-CSI4) are differently set. In this case, because the cell/TP has orthogonality, interference between NZP CSI-RS resources is less, and even in an environment in which the cells/TPs are densely disposed, a high identification probability may be acquired and measurement accuracy of NCSI-RSRP (RSRP measured based on NZP CSI-RS) is high.

When one or more cells of an active state exist, the cell of an active state may transmit NZP CSI-RS and PDSCH in the same subframe. The cell of an active state performs PDSCH Resource Element (RE) mapping according to ZP CSI-RS and PDSCH rate matching. When setting NZP CSI-RS and ZP CSI-RS, the network may reuse an existing LTE specification. When setting a DRS occasion, in order to maintain orthogonality on a cell/TP basis, the network may allocate ZP CSI-RS and NZP CSI-RS.

A resource for each CRS (CRS1) is transmitted based on Physical Cell ID (PCI) that the cell/TP has. The number of ports (CRS ports) for transmitting/receiving CRS may be determined by the network. In FIGS. 13A and 13B, it is assumed that two CRS ports are used and CRS RE of each cell/TP participating in the DRS occasion is the same. In FIGS. 13A and 13B, in all DRS subframes (SF0-SF2) belonging to the DRS occasion, it is assumed that a CRS (CRS1) is transmitted, but a CRS may be transmitted in various forms according to a '4.1.2. CRS setting method' to be described later.

As described above, the DRS occasion includes a period T2 of the DRS occasion and the number D1 of DRS subframes constituting the DRS occasion. In consideration of interference between cells/TPs and MGRP, T2 may be set to a value within a set that is formed with a multiple of 40 ms. For example, the network may set a value of T2 to one of {40 ms, 80 ms, 160 ms, etc.}. D1 is the natural number between 1 and 5, and the network may select one of values of 1 to 5 according to the number of cells/TPs and set the selected value to a Discovery signal Measurement Timing Configuration (DMTC) as a value of D1. When an MG (MG pattern) is set in consideration of inter-frequency cell discovery, the terminal may observe an entire DRS occasion within MGL=6 ms. When the terminal requires an MG, the DRS occasion is equally set on a frequency basis, and the terminal may perform inter-frequency measurement of all adjacent small cells transmitting a DRS in respective frequencies within the MG. When only DRS occasions of some small cells are aligned and when DRS occasions of the remaining small cells randomly occur, the terminal cannot perform inter-frequency measurement of small cells belonging to a corresponding frequency through an MG. That is, when DRS occasions of small cells occur in the same frequency, when some DRS occasions are aligned, and when the remaining occasions are not aligned, even if the terminal performs inter-frequency measurement through an MG, the terminal cannot measure all small cells.

When DRS occasions are equally set on a frequency basis, if setting is limited so that the serving cell sets only one MG pattern to the terminal, a case in which the terminal cannot perform both intra-frequency measurement and inter-frequency measurement may exist.

Figure 14:
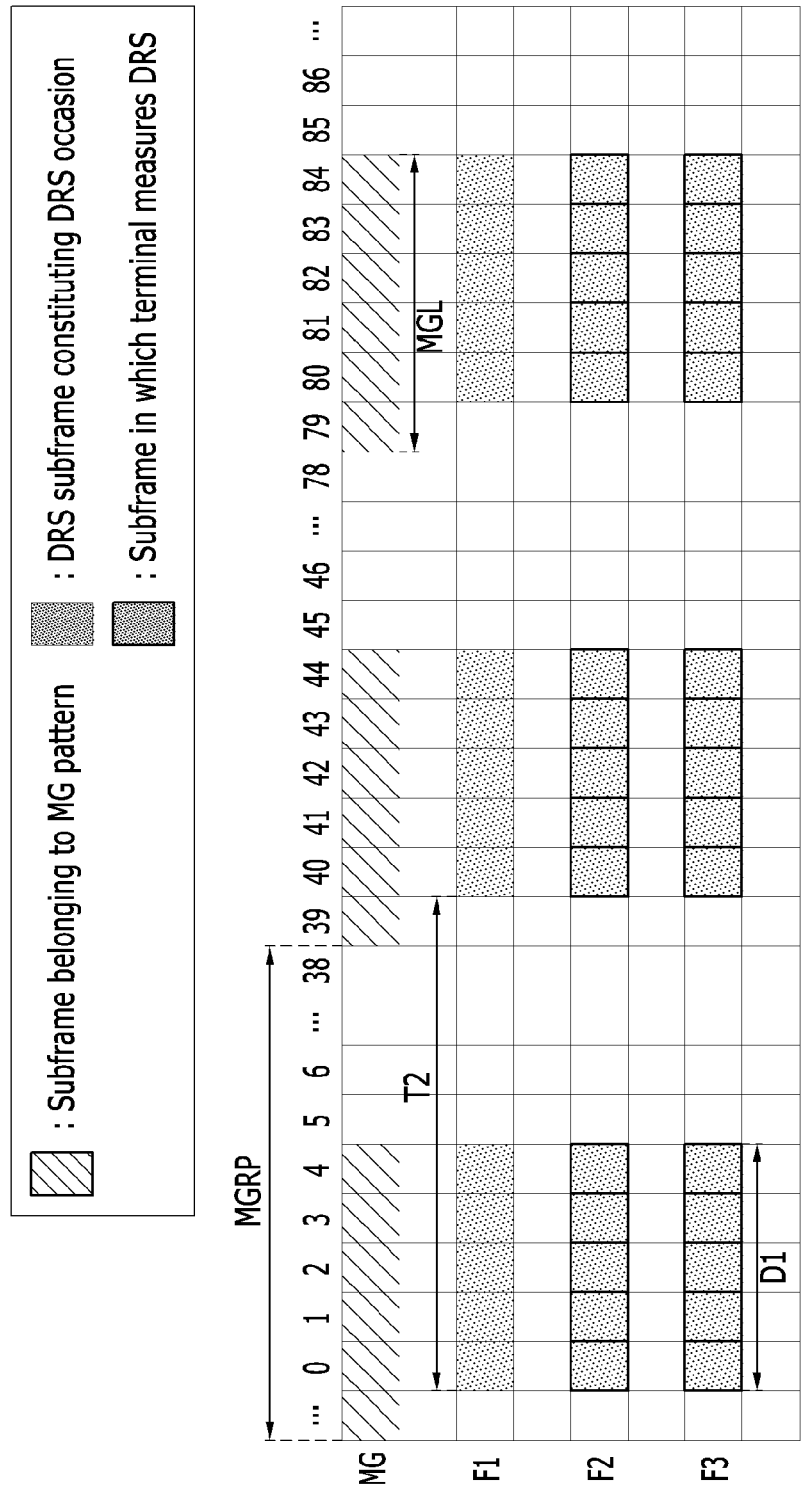
FIG. 14 is a diagram illustrating a case in which a DRS occasion period and MGRP of an MG pattern are equally set.
Figure 15:
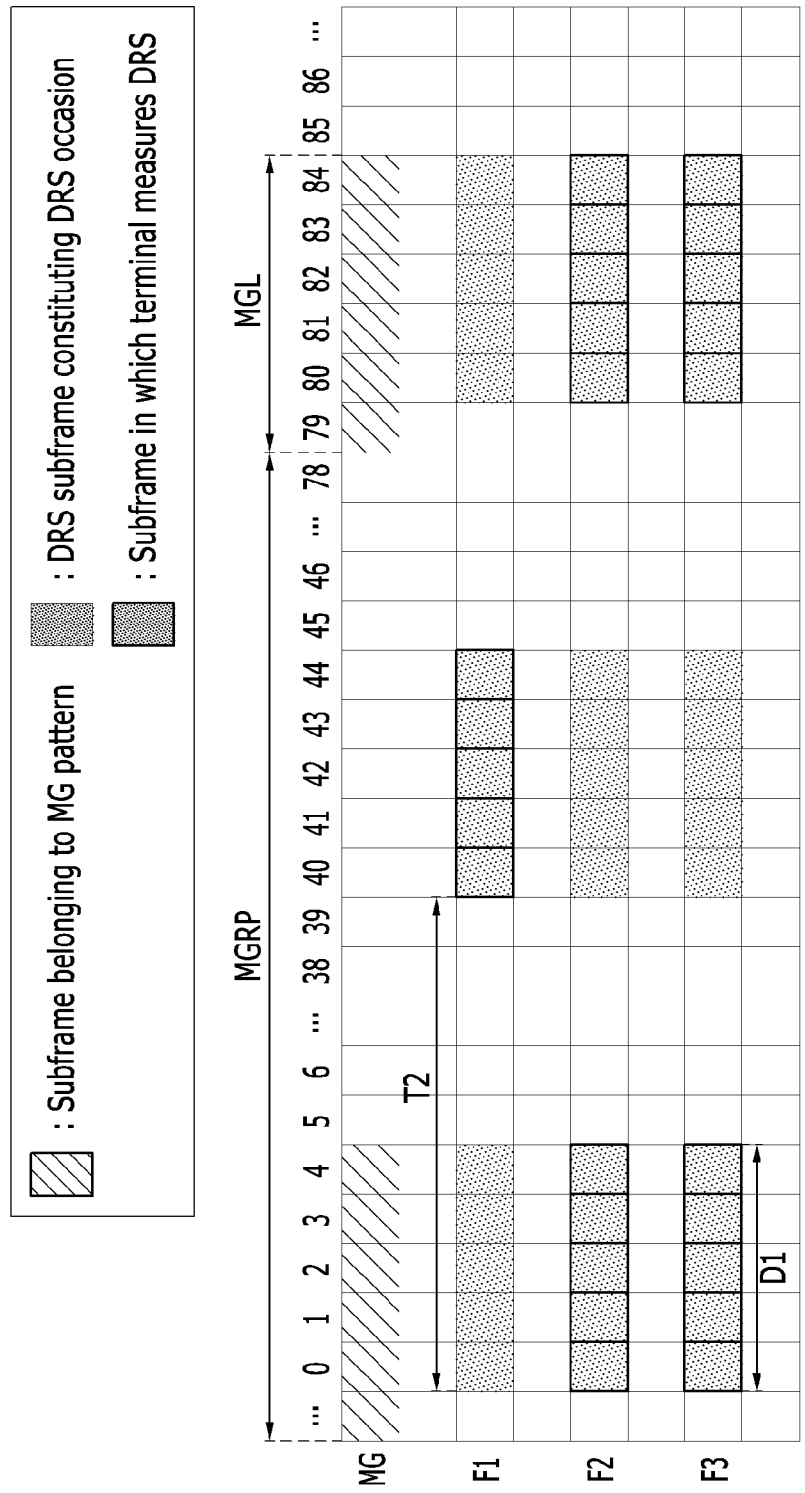
FIG. 15 is a diagram illustrating a case in which a DRS occasion period and MGRP of an MG pattern are different set.
Figure 16:
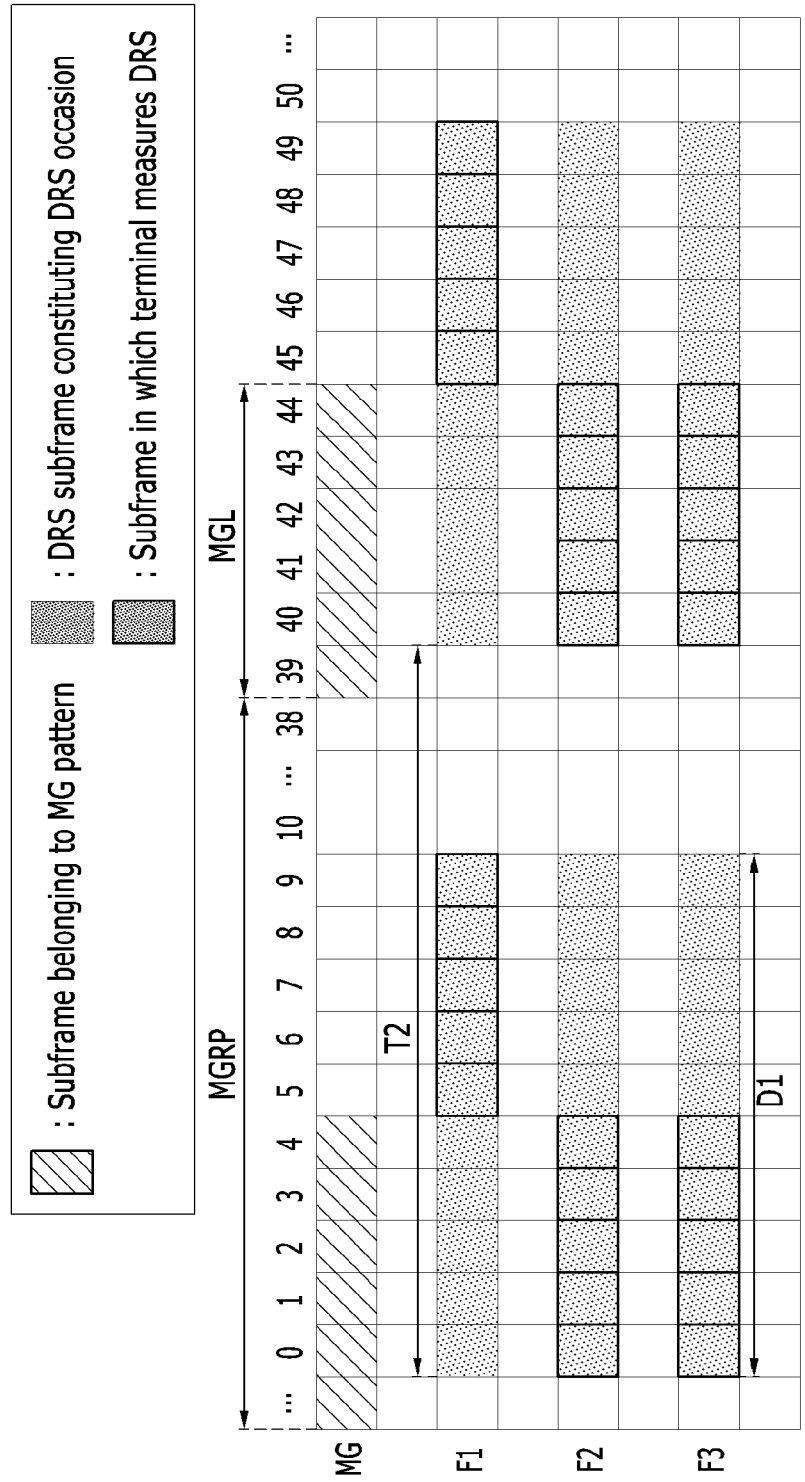
FIG. 16 is a diagram illustrating a case in which a DRS occasion period and MGRP of an MG pattern are equally set and in which the number of DRS subframes constituting a DRS occasion is set to be larger than an MGL of an MG pattern.

An example of a DRS occasion that is set on a frequency basis will be described with reference to FIGS. 14 to 16. In FIGS. 14 to 16, it is assumed that the serving cell sets only one MG pattern to the terminal.

FIG. 14 is a diagram illustrating a case in which a DRS occasion period T2 (e.g., 40 ms) and MGRP (e.g., 40 ms) of an MG pattern are the same. Specifically, in FIG. 14, it is assumed that the number D1 of DRS subframes constituting a DRS occasion is 5 ms and an MGL of an MG pattern is 6 ms. In FIG. 14, it is assumed that the terminal measures a DRS occasion in the serving frequency F1 and other frequencies F2 and F3. Here, measurement of a DRS occasion includes measurement of a DRS. In FIG. 14, it is assumed that T2s (40 ms) of a DRS occasion that is set to each of frequencies F1-F3 are the same, and D1s (5 ms) of a DRS occasion that is set to each of frequencies F1-F3 are the same. In FIG. 14, it is assumed that subframe offset of a DRS occasion that is set to each of frequencies F1-F3 are the same. DRS occasions that are set to each of frequencies F1-F3 have the same DRS subframe timing.

The terminal performs inter-frequency measurement using one MG pattern in which setting is received. The terminal measures a DRS of other frequency in a subframe corresponding to a DRS occasion among subframes belonging to an MG pattern. For example, it is assumed that the first small cell base station transmits a DRS in respective frequencies F1-F3, a third terminal of the terminals sets the frequency F1 to a serving frequency, and a fourth terminal of the terminals sets the frequency F2 to a serving frequency. The first small cell base station sets a DRS occasion to the same subframe (e.g., 0th-4th subframes, 40th-44th subframes, and 80th-84th subframes) in each of the frequencies F2 and F3 in consideration of an MG pattern that is set to the third terminal. That is, subframes (0th-4th subframes, 40th-44th subframes, and 80th-84th subframes) of a DRS occasion that is set to the frequency F2 and subframes (0th-4th subframes, 40th-44th subframes, and 80th-84th subframes) of a DRS occasion that is set to the frequency F3 are the same. The first small cell base station sets a DRS occasion in the same subframe (0th-4th subframes, 40th-44th subframes, and 80th-84th subframes) in each of frequencies F1 and F3 in consideration of an MG pattern that is set to the fourth terminal. When the first small cell base station transmits minimum DRSs, less intercell interference occurs, and the first small cell base station may thus transmit the same DRS occasion in each of frequencies F1-F3.

The MG pattern includes all DRS occasions of each of frequencies F1-F3. Specifically, an MG instance corresponding to the MG pattern may include subframes before a 0th subframe and 0th-4th subframes. Subframes before a 0th subframe and 0th-4th subframes are consecutively formed. Another MG instance corresponding to the MG pattern may include 39th-44th subframes. Another MG instance corresponding to MG pattern may include 79th-84th subframes.

When an MG pattern and a DRS occasion are set, as shown in FIG. 14, the third terminal tunes the receiver with one (e.g., F2) of other frequencies F2 and F3 in a subframe belonging to the MG pattern, and receives and measures a DRS of the other frequency F2 in a subframe of a DRS occasion that is set to the other frequency F2. Finally, the third terminal cannot receive a DRS occasion of the frequency F1. Here, reception of a DRS occasion includes reception of a DRS. Therefore, the first small cell base station should transmit a DRS even in a subframe in which the third terminal or the fourth terminal does not measure a DRS.

In order to solve a problem of FIG. 14 (i.e., in order for the terminal to perform both inter-frequency measurement and intra-frequency measurement), the first small cell base station may set an MG pattern and a DRS occasion, as shown in FIG. 15 or 16.

FIG. 15 is a diagram illustrating a case in which a DRS occasion period T2 (e.g., 40 ms) and MGRP (e.g., 80 ms) of an MG pattern are different. Specifically, in FIG. 15, it is assumed that the number D1 of DRS subframes constituting a DRS occasion is 5 ms and an MGL of an MG pattern is 6 ms. A difference between FIG. 15 and FIG. 14 will be described in detail.

The first small cell base station may set T2 and MGRP to different values. Because the third terminal should measure the entire of a DRS occasion of the inter-frequency F1 and a DRS occasion of intra-frequencies F2 and F3, the first small cell base station may transmit a DRS occasion having a half period T2 of MGRP. For example, when MGRP=80 ms, the first small cell base station may set T2 to 40 ms. When MGRP=40 ms, the first small cell base station may set T2 to 20 ms. In this case, small cells adjacent to the first small cell base station transmit a DRS to correspond to T2.

In FIG. 15, an MG instance corresponding to an MG pattern may include subframes before a 0th subframe and 0th-4th subframes. Another MG instance corresponding to the MG pattern may include 79th-84th subframes.

The third terminal tunes the receiver with one (e.g., F2) of other frequencies F2 and F3 in a subframe belonging to the MG instance, and receives and measures a DRS of another frequency F2 in a 0th subframe to a fourth subframe of a DRS occasion that is set to another frequency F2. The third terminal tunes the receiver with the frequency F1 after the MG instance, and receives and measures a DRS of the frequency F1 in 40th-44th subframes of a DRS occasion that is set to the frequency F1. The third terminal tunes the receiver with one (e.g., F3) of other frequencies F2 and F3 in a subframe belonging to a next MG instance, and receives and measures a DRS of the other frequency F3 in 80th-84th subframes of a DRS occasion that is set to the other frequency F3.

Therefore, as shown in FIG. 15, when a DRS occasion and an MG pattern are set, the third terminal may measure a DRS in respective frequencies F1-F3.

FIG. 16 is a diagram illustrating a case in which a DRS occasion period T2 (e.g., 40 ms) and MGRP (e.g., 40 ms) of an MG pattern are the same and in which the number D1 (e.g., 10 ms) of DRS subframes constituting a DRS occasion is larger than an MGL (e.g., 6 ms) of an MG pattern. A difference between FIG. 16 and FIG. 14 will be described in detail.

The first small cell base station may set D1 and an MGL to different values. Specifically, the first small cell base station may set a value (e.g., 10 ms) larger than an MGL (e.g., 6 ms) to D1. The third terminal performs DRS measurement of inter-frequencies F2 and F3 using a portion (DRS subframe of a smaller number than D1) of a DRS occasion belonging to an MG pattern. Thereafter, the third terminal performs DRS measurement of an intra-frequency F1 using the remaining subframes (DRS subframe of a smaller number than D1) belonging to a DRS occasion. In contrast, the third terminal may first perform DRS measurement of the intra-frequency F1 and may perform DRS measurement of inter-frequencies F2 and F3. This may be analyzed such that the first small cell base station and adjacent small cells repeatedly transmit a DRS occasion twice in order to measure a DRS of inter-frequencies F2 and F3. Therefore, it is preferable that D1 is set to a larger value (e.g., twice that of an MGL). When the first small cell base station repeats a DRS occasion twice, in order to reduce an RRC signaling overhead, it is preferable to repeat the same DRS occasion one more time.

In FIG. 16, the number of subframes constituting a DRS occasion that is set to respective frequencies F1-F3 is 10. Specifically, subframes of the DRS occasion for respective frequencies F1-F3 are 0th-9th subframes, or 40th-49th subframes.

The third terminal tunes the receiver with one (e.g., F2) of other frequencies F2 and F3 in a subframe belonging to an MG instance, and receives and measures a DRS of another frequency F2 in some subframes (e.g., 0th-4th subframes) among subframes (0th-9th subframes) of a DRS occasion that is set to another frequency F2. The third terminal tunes the receiver with the frequency F1 after an MG instance, and receives and measures a DRS of the frequency F1 in some subframes (e.g., 5th-9th subframes) of subframes (0th-9th subframes) of a DRS occasion that is set to the frequency F1. The third terminal tunes the receiver with one (e.g., F3) of other frequencies F2 and F3 in a subframe belonging to a next MG instance, and receives and measures a DRS of another frequency F3 in some subframes (e.g., 40th-44th subframes) of subframes (40th-49th subframes) of a DRS occasion that is set to another frequency F3. The third terminal tunes the receiver from the frequency F3 to the frequency F1 after an MG instance, and receives and measures a DRS of the frequency F1 in some subframes (e.g., 45th-49th subframes) of subframes (40th-49th subframes) of a DRS occasion that is set to the frequency F1.

Therefore, as shown in FIG. 16, when a DRS occasion and an MG pattern are set, the third terminal may measure a DRS in respective frequencies F1-F3.

In FIG. 16, it is assumed that one DRS occasion includes consecutive 10 subframes, but the DRS occasion may be set so that some subframes of the DRS occasion separate from the remaining subframes. For example, when a first small cell base station repeats a DRS occasion twice, it is assumed that a first DRS occasion of repeated DRS occasions is a first DRS occasion and a second DRS occasion of repeated DRS occasions is a second DRS occasion. The first small cell base station may set a start subframe of the second DRS occasion based on a subframe of the first DRS occasion. The first small cell base station may use a method of setting subframe offset of a DRS occasion of an inter-frequency. For example, when the first DRS occasion includes 0th-4th subframes, the first small cell base station may be set to include 10th-14th subframes in the second DRS occasion. In this case, inter-occasion offset that is defined with a start subframe difference between the first DRS occasion and the second DRS occasion is 10. That is, the first DRS occasion and the second DRS occasion nonconsecutively occur. In FIG. 16, the first DRS occasion and the second DRS occasion consecutively occur.

4.1.1. Setting Method of PSS/SSS

A sequence of a PSS and a SSS is generated with a method that is determined in LTE Release-8 (Rel-8) based on PCI of a corresponding cell/TP. A subframe including a PSS/SSS among subframes of a DRS occasion may be a 0th subframe or a 5th subframe.

When it is assumed that a cell/TP is synchronized with a small cell/TP operating in all frequencies that a geographically adjacent base station has, even if an entire cell/TP does not transmit a PSS/SSS in a dense cell scenario, the terminal may acquire synchronization. In such a case, all cells/TPs may transmit a PSS/SSS and only a few cells/TPs may transmit a PSS/SSS according to setting of a network.

4.1.2. Setting Method of CRS

In one subframe or a plurality of subframes of a DRS subframe, a CRS may be transmitted. A sequence of a CRS is generated based on a PCI. A method of notifying the terminal whether a CRS is transmitted from which DRS subframe of subframes of a DRS occasion includes at least two methods. A first method is a method in which a network sets a DRS subframe in which CRS is transmitted. The network may signal a CRS subframe (subframe including a CRS among DRS subframes) to the terminal. For example, the network may notify the terminal of a location of the CRS subframe on a frequency basis, on a cell/TP basis, and in a bit map form. A second method is a method of previously defining a DRS subframe in which CRS is transmitted as a specification (e.g. LTE specification). For example, it may be defined that a CRS is always transmitted in an entire DRS subframe. In this case, a bit map corresponding to the CRS subframe may be [1, 1, 1, . . . , 1]. For another example, a location and the number of CRS subframes may be calculated through a function of a PCI. A calculation result may be given in a form of a relative offset. It is preferable that the number of CRS subframes is high to acquire sufficient accuracy of RSRP or RSRQ measurement.

Appropriate use of the CRS subframe may be divided into the following three methods according to an already known PCI planning method. When a scenario is a randomized cell ID scenario in which a PCI is randomly disposed, a location of the CRS subframe is randomly disposed, and even in a dense cell scenario, an interference avoidance effect between CRSs may be acquired. When a scenario is a sector aligned cell ID scenario in which a PCI is disposed to correspond to a location of CRS RE on a sector basis of a macrocell, the terminal receives interference between CRSs. In a dense cell scenario, when the terminal has a receiving interference cancellation function, if intercell synchronization is disposed to correspond well, an appropriate RSRP or RSRQ measurement value may be obtained. When a scenario is a shared cell id scenario in which an entire cell uses the same PCI, an entire CRS is the same and thus it is preferable that the terminal does not measure RSRP or a RSRQ based on a CRS. Therefore, the terminal should distinguish a cell/TP using signals other than a CRS. The terminal may distinguish TP using a CSI-RS in a DRS occasion.

When all cells/TPs are synchronized with a time or a frequency and transmit a DRS subframe, all cells/TPs may not transmit a PSS/SSS. In a dense cell scenario, the terminal may receive synchronization for CRS decoding of a cell/TP from another cell/TP. In such a case, CRS configuration information includes a PCI of a reused PSS/SSS. In a time domain and a frequency domain between a PSS/SSS corresponding to the reused PCI and a CRS port $\{0, 1, 2, 3\}$ of a cell/TP, a quasi-colocation (qcl) property is satisfied. When frequency synchronization between cell/TPs correspond (less than 0.1 ppm), a qcl property is additionally satisfied in a frequency domain. The terminal acquires synchronization from a PSS/SSS corresponding to a PCI that receives signaling and decodes a CRS. The terminal may perform RRM measurement and CSI feedback.

When synchronization assumption is impossible between cells/TPs, a PSS/SSS is used as a synchronization reference for CRS decoding. When one small cell transmits all of a PSS/SSS and a CRS that are generated with the same PCI, the terminal may acquire synchronization and may perform RRM measurement. However, when a plurality of TPs operate based on Virtual Cell ID (VCI), the terminal cannot distinguish a PSS/SSS and a CRS on a TP basis and thus cannot perform RRM measurement with only a CRS.

4.1.3. Setting Method of CSI-RS

For RSRP measurement and CSI feedback, the terminal may measure an NZP CSI-RS. When all or a portion of a cell/TP has the same PCI (e.g., shared cell id scenario), the terminal cannot perform RRM measurement with only a CRS and thus uses an NZP CSI-RS for RRM measurement. Even in a dense cell scenario, in order to obtain high RSRP measurement accuracy and to perform accurate cell/TP identification with a high probability, each cell/TP may set an NZP CSI-RS resource in plural and increase the number of REs. Alternatively, by setting a plurality of CSI-RS antenna ports, each cell/TP may increase the number of REs. Each cell/TP can prevent collision between an NZP CSI-RS and PDSCH through setting of an appropriate ZP CSI-RS.

Appropriate use of a CSI-RS subframe (subframe including a CSI-RS among DRS subframes) may be divided into the following three methods according to an already known PCI planning method. When a scenario is a randomized cell ID scenario, each small cell receives allocation of different PCIs. In this case, an NZP CSI-RS that is set on a small cell basis may be used for CSI feedback (e.g., a Channel Quality Indicator (CQI), a Precoding Matrix Indicator (PMI), and a Rank Indicator (RI)). When a scenario is a Sector aligned cell ID scenario, each small cell allocates different PCIs, but because CRS REs are overlapped, receiving performance of the terminal reduces. In such a case, an NZP CSI-RS resource or a ZP CSI-RS resource is appropriately set, and thus the terminal may perform RSRP measurement on each TP basis. An NZP CSI-RS may be used for CSI feedback. When a scenario is a shared cell ID scenario, each cell/TP uses the same PCI and thus the terminal may perform RSRP measurement on each TP basis using a scrambled NZP CSI-RS based on a VCI. An NZP CSI-RS may be used for CSI feedback.

A serving cell of a terminal signals the number of antenna ports that are used for transmitting/receiving of an NZP CSI-RS, a period of an NZP CSI-RS subframe (subframe including NZP CSI-RS among DRS subframes), offset of an NZP CSI-RS subframe, NZP CSI-RS scrambling ID, a qcl property, a length of an NZP CSI-RS sequence, and a NZP CSI-RS resource configuration to the terminal. When a scenario is a shared cell ID scenario, it is preferable that the serving cell of the terminal signals Energy Per RE (EPRE) or p-C-r10. p-C-r10 is a parameter that can estimate EPRE. Because EPRE or p-C-r10 is different at every cell/TP, it is preferable that the serving cell of the terminal notifies the terminal of a plurality of EPREs or p-C-r10s. The terminal may estimate a DL power attenuation amount based on EPRE or p-C-r10 and use EPRE or p-C-r10 for power control for transmitting UL.

A method of notifying the terminal of a DRS subframe in which an NZP CSI-RS is transmitted includes at least two methods. A first method is a method in which a network sets a DRS subframe in which NZP CSI-RS is transmitted. For example, the network may signal a location of NZP CSI-RS subframes on a frequency basis, on a cell/TP basis, and in a bit map form. For another example, the network may set a period of the NZP CSI-RS subframe or a period of a ZP CSI-RS subframe (subframe including a ZP CSI-RS among DRS subframes) to be equal to that of the DRS occasion, and may adjust a value of offset of the NZP CSI-RS subframe or offset of the ZP CSI-RS subframe so that an NZP CSI-RS or a ZP CSI-RS occurs within the DRS occasion. In this case, configuration information of an NZP CSI-RS or a ZP CSI-RS may be extended, and a period of the NZP CSI-RS subframe or a period of the ZP CSI-RS subframe may be set to a long period (e.g., 160 ms) that is not defined in an existing specification (e.g. LTE specification).

The second method is a method of previously defining a DRS subframe in which an NZP CSI-RS is transmitted in a specification (e.g. LTE specification). For example, a location and the number of the NZP CSI-RS subframes may be calculated through a function of a PCI or a function of a VCI. A calculation result may be given in a form of relative offset. It is preferable that the number of NZP CSI-RS subframes is high to obtain sufficient accuracy of RSRP measurement. Alternatively, only one CSI-RS subframe may be represented within the DRS occasion.

For interference control between cells/TPs, zeroTxPower-CSI-RS-r10 may be set together.

When all cells/TPs are synchronized to transmit a DRS subframe, all cells/TPs may not transmit a PSS/SSS. Particularly, in a dense cell scenario, the terminal may receive synchronization for NZP CSI-RS decoding of the cell/TP from other cells/TPs. In such a case, in configuration information of an NZP CSI-RS, a PCI of a reused PSS/SSS is included. In a time domain and a frequency domain between a PSS/SSS corresponding to a reused PCI and an NZP CSI-RS port {15, . . . , 14+v} (where v is the number of NZP CSI-RS antenna ports) of a cell/TP, a qcl property is satisfied. A serving cell of the terminal selects a PCI of a PSS/SSS to be reused so that a reused PSS/SSS and an NZP CSI-RS port satisfy the qcl property.

When synchronization assumption between cells/TPs is impossible, as synchronization reference for NZP CSI-RS decoding, a PSS/SSS or a CRS may be used. In such a case, for NZP CSI-RS decoding, the network may signal a qcl property of {PCI or CRS port} and {NZP CSI-RS} to the terminal.

In a dense cell scenario, when a shared cell ID operation is considered, one cell/TP may set a plurality of NZP CSI-RS resources. The terminal may acquire time and frequency synchronization using all or a portion of a plurality of NZP CSI-RS resources. Thereafter, the terminal may perform RRM measurement (e.g., RSRP measurement) using all or a portion of a plurality of NZP CSI-RS resources. In such a case, even if the terminal does not signal a qcl relationship of a time and frequency property between a PSS/SSS based on a reused PCI and a CRS port of a cell/TP, the terminal may perform RRM measurement.

For inter-frequency measurement, the serving cell may set an MG pattern to the terminal. The terminal may receive a DRS occasion of an inter-frequency within an MG.

4.2. Measurement of DRS Occasion

The DRS occasion may include a PSS, an SSS, and a CRS. In this case, it is assumed that RRM that is measured based on the CRS is C-RRM.

C-RRM is different from RRM that is measured according to an existing LTE specification. An RRM measurement method according to an existing LTE specification uses a CRS that is included in all subframes for RRM measurement, but a C-RRM measurement method uses only the CRS that is included in the DRS occasion for RRM measurement. According to an existing LTE specification, the serving cell transmits a CRS in all subframes and periodically transmits a DRS occasion (including at least one of a PSS, an SSS, and a CRS) and thus operation of the terminal is different according to each case.

C-RRM includes C-RSRP (RSRP measured based on a CRS) and a C-RSRQ (RSRQ measured based on a CRS). C-RRM may follow a definition of a specification 36.214.

In a Randomized cell ID scenario or a sector aligned cell ID scenario, the terminal may perform C-RRM measurement in a DRS occasion. When a dense cell scenario is considered together, the terminal may perform C-RRM measurement through an Interference Cancellation (IC) function thereof.

In a shared cell ID scenario, even if PCI-based signals are used, the terminal cannot distinguish a cell/TP and thus the small cell should use a VCI-based signal. When an NZP CSI-RS is scrambled based on a VCI, the terminal may perform RRM measurement on a VCI basis. CSI-RSRP may be used for intra-frequency handover, SCell activation/deactivation in carrier aggregation, or SCell activation/deactivation in dual connectivity.

4.2.1. RRM Measurement Based on CRS

The terminal demodulates a CRS and measures RRM in a CRS subframe that is set within a DRS occasion. When the terminal performs C-RSRP measurement or C-RSRQ measurement of a cell of an active state, the terminal may measure a CRS in every subframe and thus follows an existing LTE specification. When the terminal performs C-RSRP measurement or C-RSRQ measurement of a cell of a DTx state, the terminal cannot receive a CRS subframe at a location other than the DRS occasion and thus follows an RRM measurement method in a restricted measurement subframe that is defined in a present LTE specification.

4.2.2. RRM Measurement Based on CSI-RS

The terminal demodulates a CSI-RS in a CSI-RS subframe that is set within a DRS occasion and measures RRM. Measurement accuracy of this time may follow accuracy that is defined for C-RRM measurement.

Particularly, a CSI-RSRQ (RSRQ measured based on a CSI-RS) may be used for inter-frequency handover and SCell activation/deactivation in a shared cell ID scenario. Specifically, a CSI-RSRQ may be defined by Equations 1 to 4.

$$CSI\text{-}RSRQ = N*CSI\text{-}RSRP/C\text{-}RSSI \quad \text{[Equation 1]}$$

$$CSI\text{-}RSRQ = N*CSI\text{-}RSRP/CSI\text{-}RSSI \quad \text{[Equation 2]}$$

$$CSI\text{-}RSRQ = N*CSI\text{-}RSRP/(CSI\text{-}RSSI + N*CSI\text{-}RSRP) \quad \text{[Equation 3]}$$

$$CSI\text{-}RSRQ = CSI\text{-}RSRP/(\text{Noise power} + \text{Sum of all } CSI\text{-}RSRP(i), \text{ where } i \text{ is the index of a cell whose NZP CSI-RS is transmitted within the considering DRS occasion.}) \quad \text{[Equation 4]}$$

In Equations 1 to 4, N represents the number of Resource Blocks (RB) that are used for measuring CSI-RSRP, a C-RSSI represents an RSSI that is measured based on CRS belonging to a CRS occasion, and an CSI-RSSI represents RSSI that is measured based on a CSI-RS. In Equation 4, CSI-RSRP of a numerator is RSRP that is measured using a CSI-RS that is regarded as a signal, and may be RSRP of an adjacent cell or the serving cell of the terminal. CSI-RSRP(i) of a denominator is RSRP that is measured using a CSI-RS that is regarded as interference, and may be RSRP of an adjacent cell or the serving cell of the terminal.

Several methods of measuring a CSI-RSSI exist.

4.2.2.1. Method of Reusing Existing RSSI

In an RB pair for measuring CSI-RSRP, the terminal may measure a CRS-based RSSI that is defined in an existing LTE specification and use a measuring value thereof as a CSI-RSSI. The method corresponds to Equation 1.

4.2.2.2. Method of Measuring RSSI in OFDM Symbol not Including Both CRS and NZP CSI-RS A CRS and an NZP CSI-RS are transmitted regardless of an offered traffic load of a cell in a DRS occasion. When an OFDM symbol in which a CSI-RSSI is measured includes a CRS or an NZP CSI-RS, the terminal cannot accurately measure traffic intensity based on a CSI-RSSI. Therefore, the terminal may measure CSI-RSSI using an OFDM symbol not including a CRS and an NZP CSI-RS. Alternatively, it is preferable that the terminal measures CSI-RSSI using an OFDM symbol (not including all of a CRS, an NZP CSI-RS, a PSS, and an SSS) not including a PSS/SSS that is included in a DRS occasion as well as a CRS and an NZP CSI-RS. A CSI-RSRQ that is calculated with the method has a characteristic similar to a Signal-to-Interference plus Noise Ratio (SINR). In an RB pair in which a CSI-RSRP is measured, the terminal may measure and use a CSI-RSSI. In this case, the serving cell of the terminal may transfer an OFDM symbol index through higher-layer signaling. Alternatively, the terminal may measure a CSI-RSSI using a single or a plurality of 5th and 6th OFDM symbols of a second slot. The method corresponds to Equations 2 and 3.

4.2.2.3. Method of Measuring RSSI in OFDM Symbol Including NZP CSI-RS

CSI-RSRP may be used for RRM measurement of an intra-frequency in a shared cell ID scenario or a sector aligned cell ID scenario. In such a case, because the terminal cannot identify a cell/TP with a CRS, the terminal may perform cell/TP identification and RRM measurement with a CSI-RS. The terminal may measure CSI-RSSI using OFDM symbols including NZP CSI-RS (or NZP CSI-RS RE). The terminal may measure and use a CSI-RSSI in an RB pair in which a CSI-RSRP is measured. In this case, in a dense cell scenario, because an NZP CSI-RS and a ZP CSI-RS are much overlapped, the terminal cannot accurately estimate intensity of a received signal from a corresponding cell/TP and adjacent cell/TP with a CSI-RSSI measurement value. The method corresponds to Equations 2 and 3.

4.2.2.4. Method of Measuring RSSI in OFDM Symbol not Including NZP CSI-RS

The serving cell adjusts to not include an NZP CSI-RS in an OFDM symbol in which a CSI-RSSI is measured. The serving cell of the terminal designates an OFDM symbol index that the terminal is to use when measuring a CSI-RSSI. In the designated OFDM symbol, an NZP CSI-RS is included. In an equation that defines a CSI-RSRQ, the sum of CSI-RSRP is present in a denominator. The denominator of the equation may be analyzed as measured intensity by adding all signals that the terminal receives. The method corresponds to Equations 2 and 3.

4.2.2.5. Method of Measuring RSSI by Adding all CSI-RSRP that the Terminal Receives in a CSI-RS Subframe A CSI-RSSI should represent an added amount of intensities of entire signals received by the terminal. In order to estimate intensity of an overlapped received signal, the terminal measures CSI-RSRP from an NZP CSI-RS resource that should measure in a corresponding CSI-RS subframe (subframe to measure an RSSI). The terminal separately measures noise power. The terminal adds both measured CSI-RSRP and measured noise power. At this time, when an adjacent cell/TP, having transmitted a CSI-RS transmits PDSCH, it is assumed that a magnitude of PDSCH receiving power that the terminal measures is the same as CSI-RSRP. In this case, there is a merit that it is unnecessary to separately measure an RSSI. The method corresponds to Equation 4.

4.2.3. Terminal Monitoring Behavior

According to an LTE specification, a terminal of an active state should receive PDCCH or EPDCCH (hereinafter, 'PDCCH or EPDCCH' is referred to as 'PDCCH/EPDCCH') of an entire serving cell in a subframe belonging to onDuration. The terminal of a Discontinuous reception (DRx) state receives PDCCH/EPDCCH according to a previously determined period by RRC signaling and does not receive PDCCH/EPDCCH in other subframes. Because an LTE specification considers only an always-active cell, it is inefficient to apply a DRx behavior of an LTE specification to a scenario in which an on/off-capable cell as well as the always-active cell exists.

4.2.3.1. Carrier Aggregation (CA) Scenario

In the CA scenario, the terminal may perform a DRx behavior or a DRx operation with various methods.

4.2.3.1.1. Method in which Terminal Performs the Same UE-Specific DRx Operation Regardless of Frequency (Hereinafter, 'First DRx Method')

The first DRx method enforces unnecessary PDCCH demodulation or EPDCCH demodulation to the terminal, and the serving cell of the terminal may avoid this through cross-carrier scheduling. The serving cell of the terminal sets cross-carrier scheduling, and when a PCell schedules a SCell(s), the terminal performs a DRx behavior for only the PCell and does not observe PDCCH/EPDCCH of a corresponding SCell and thus battery waste of the terminal is less regardless of a state of the SCell.

4.2.3.1.2. Method in which Terminal Independently Performs UE-Specific DRx Operation on Frequency Basis (Hereinafter, 'Second DRx Method')

In a CA scenario, because the PCell is always in an active state, the terminal performs a DRx operation according to an LTE specification. At this time, the terminal of an active state should observe PDCCH/EPDCCH in an entire subframe for the PCell and the SCell. When a DRx behavior and a DTx behavior are not considered together, the terminal should observe PDCCH/EPDCCH of all serving cells including the Pcell according to DRx related timers that are set through RRC signaling. When the SCell of the terminal is in a DTx state, the SCell may not transmit PDCCH/EPDCCH in some subframes, but the terminal should observe PDCCH/EPDCCH in such subframes according to a DRx behavior of an LTE specification. This corresponds to a case in which the terminal uselessly observes PDCCH/EPDCCH. In order to reduce such pointless battery consumption, the terminal may perform an independent DRx operation on a frequency basis.

Specifically, the second DRx method may include a second-1 DRx method and a second-2 DRx method.

The second-1 DRx method is a method in which the terminal performs two UE-specific DRx operations according to a state of the serving cell. When the serving cell is in an active state, the terminal may perform a legacy LTE DRx behavior at a frequency in which the serving cell of an active state operates. However, when the serving cell is in a DTx state, the serving cell does not transmit PDCCH/EPDCCH to the terminal of an active state and thus the terminal performs useless demodulation. Therefore, the terminal detects a state of the serving cell, and when the serving cell is in an active state, the terminal performs a legacy DRx behavior, while when the serving cell is in a DTx state, the terminal performs a changed DRx behavior.

In the second-1 DRx method, when the terminal erroneously determines a state of the serving cell, a problem that the serving cell and the terminal estimate a DRx behavior of other terminals may occur. In order for the terminal to properly detect a state of the serving cell, the terminal should frequently perform a more elaborate operation and thus a battery of the terminal is inefficiently used. For example, in order for the terminal to detect a state of the serving cell, when it is implemented with a metric of whether PDCCH/EPDCCH exists, the terminal has a form that performs a changed Radio Link Failure (RLF) decision. This causes the same effect as that of a case in which the terminal performs the same DRx behavior regardless of a frequency. Therefore, in order for the terminal to efficiently perform the second-1 DRx method, it is preferable to explicitly receive signaling of a state of the serving cell from a corresponding serving cell or another serving cell.

The second-1 DRx method is a method in which the terminal performs a cell-specific DRx behavior or a cluster-specific DRx behavior regardless of a state of the serving cell. When a state of the serving cell may often change, it is preferable that the terminal does not perform a UE-specific DRx behavior at a frequency in which the serving cell having a changing state operates, but the terminal performs a small cell cluster-specific DRx behavior or a cell-specific DRx behavior that the serving cell determines. In such a case, because all terminals having a corresponding cell as a serving cell perform the same DRx cycle, when all terminals are in a DRx state, a state of a corresponding cell may be converted to a DTx state. For example, it is assumed that in a frequency F4, a PCell of an active state operates, and in a frequency F5, an SCell of a DTx state operates, so self-scheduling is applied. It is assumed that the terminal performs different DRx behaviors at respective frequencies F4 and F5. In the frequency F4, the terminal performs a DRx operation that is defined in an LTE specification. The serving cell of the terminal may set a separate onDurationTimer to be equal to D1 of a DRS occasion to the terminal in the frequency F5 and set an inactivityTimer to a minimum value (e.g., a 0 subframe). Thereby, in a subframe that does not belong to a DRS occasion, the terminal does not observe PDCCH/EPDCCH. The serving SCell may transmit data (state of a serving SCell=active state) or may not transmit data (state of a serving SCell=DTx state) within a subframe belonging to the DRS occasion. When the terminal is in an active state, the terminal observes PDCCH/EPDCCH in an entire subframe.

4.2.3.2. Dual Connectivity (DC) Scenario

In a DC scenario, a PCell of a master cell group (MCG) and a primary SCell (pSCell) of a secondary cell group (SCG) of the terminal are always in an active state. The terminal performs a DRx operation in a PCell of the MCG according to an LTE specification. In a DC scenario, the terminal of an active state may be set to observe PDCCH/EPDCCH in the same subframe in a PCell and an SCell belonging to the MCG and in a pSCell and a secondary SCell (sSCell) belonging to an SCG, as in a CA scenario. A DRx behavior of the terminal and a DTx behavior of the small cell are not considered together, and when a DRx behavior and a DTx behavior are independently set, the terminal should observe PDCCH/EPDCCH of all serving cells belonging to an MCG and an SCG according to DRx timers that are set through RRC signaling. In this case, the terminal of an active state uselessly observes PDCCH/EPDCCH of a SCell/sSCell of a DTx state and thus this is inefficient.

As in a CA scenario, in order to reduce such pointless battery consumption, when the terminal sets an on/off-capable cell as the serving cell, it is preferable to not perform a DRx operation in a frequency of the serving cell. That is, the terminal does not observe PDCCH/EPDCCH for the serving cell of a DTx state. It is preferable that the terminal performs a DRx operation only for the serving cell of an active state. Therefore, in the CA scenario, as in a described method, it is preferable that the terminal independently performs a DRx operation on a frequency basis. Further, when a state of a considered SCell is an active state, the terminal performs a legacy DRx operation, and when a state of the considered SCell is a DTx state, the terminal does not observe PDCCH/EPDCCH.

In a DC scenario, because a delay time occurs in information transfer through backhaul between cell groups (CGs) or between eNodeBs (non-ideal backhaul), it is preferable to define a separate DRx behavior on a CG basis. That is, the terminal performs a DRx operation that is defined in an LTE specification in a PCell of an MCG and a pSCell of an SCG. Further, it is preferable that the terminal equally performs Radio Link Monitoring (RLM) that is defined for the PCell of an MCG for the pSCell of an SCG in TS 36.133. For the SCell of the MCG and the sSCell of the SCG, it is preferable that the serving cell of the terminal independently defines a separate DRx related timer on a frequency basis to the terminal and independently operates.

In a DC scenario, a DRx behavior that a terminal performs will be described with reference to FIG. 17.

Figure 17:
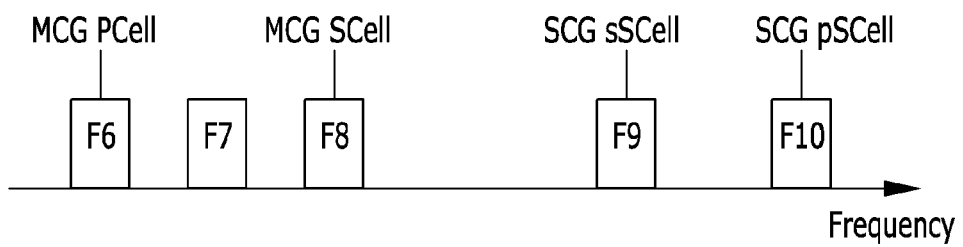
FIG. 17 is a diagram illustrating an example of a serving cell that is set to a terminal in a DC scenario.

FIG. 17 is a diagram illustrating an example of a serving cell that is set to a terminal in a DC scenario. Specifically, in FIG. 17, it is assumed that a PCell of an active state of an MCG is set to a frequency F6, a SCell of a DTx state of the MCG is set to a frequency F8, a pSCell of an active state of an SCG is set to a frequency F10, and an sSCell of a DTx state of the SCG is set to a frequency F9.

The terminal analyzes the frequency F6 and the frequency F8 as one CA, and analyzes the frequency F9 and the frequency F10 as another independent CA, and in a '4.2.3.1. CA scenario', the above-described methods are each applied.

In the frequency F6, the terminal performs a UE-specific DRx behavior that is defined in an LTE specification.

In the frequency F8, the terminal performs a cell-specific DRx behavior or a cluster-specific DRx behavior according to a DTx behavior of the SCell.

In the frequency F10, the terminal performs a UE-specific DRx behavior that is defined in an LTE specification.

In the frequency F9, the terminal performs a cell-specific DRx behavior or a cluster-specific DRx behavior according to a DTx behavior of an sSCell.

Figure 18:
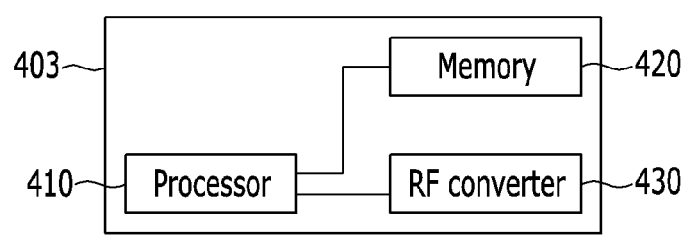
FIG. 18 is a block diagram illustrating a configuration of a small cell.

FIG. 18 is a block diagram illustrating a configuration of a small cell 403. The small cell 403 includes a processor 410, a memory 420, and a radio frequency (RF) converter 430.

The processor 410 may be formed to implement a procedure, a function, and a method that are related to the above-described small cell and serving cell.

The memory 420 is connected to the processor 410 and stores various information that is related to operation of the processor 410.

The RF converter 430 is connected to the processor 410 and transmits or receives a wireless signal. The small cell 403 may have a single antenna or multiple antennas.

The above-described small cell or macrocell may be formed equally to or similarly to the small cell 403. For example, the serving cells 400 and 401 may be formed equally to or similarly to the small cell 403.

Figure 19:
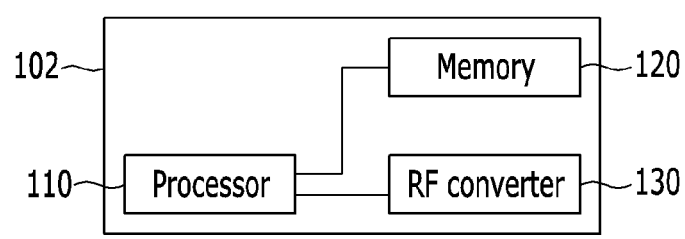
FIG. 19 is a block diagram illustrating a configuration of a terminal.

FIG. 19 is a block diagram illustrating a configuration of a terminal 102.

The terminal 102 includes a processor 110, a memory 120, and an RF converter 130.

The processor 110 may be formed to implement a procedure, a function, and a method that are related to the above-described terminal.

The memory 120 is connected to the processor 110 and stores various information that is related to operation of the processor 110.

The RF converter 130 is connected to the processor 110 and transmits or receives a wireless signal. The terminal 102 may have a single antenna or multiple antennas.

The above-described terminal may be formed equally to or similarly to the terminal 102. For example, the terminals 100 and 101 may be formed equally to or similarly to the terminal 102.

According to an exemplary embodiment of the present invention, a terminal can efficiently measure RRM based on a discovery signal in an environment in which a macrocell and a plurality of small cells exist.

According to an exemplary embodiment of the present invention, a serving cell can signal a signal for efficiently measuring RRM to a terminal in an environment in which a macrocell and a plurality of small cells exist.

According to an exemplary embodiment of the present invention, a terminal can efficiently measure RRM based on a discovery signal in the same frequency as a serving frequency of a serving cell.

According to an exemplary embodiment of the present invention, a terminal can efficiently measure RRM based on a discovery signal in a frequency that is different from a serving frequency of a serving cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a terminal measures Radio Resource Management (RRM) in an environment in which a macrocell and a plurality of small cells exist, the method comprising:
   receiving a discovery signal from a first small cell adjacent to the terminal among the plurality of small cells;
   measuring, when the first small cell is in a predetermined state, RRM of the first small cell based on the discovery signal; and
   receiving a measurement subframe bit pattern representing a measurement subframe in which the terminal can measure RRM based on the discovery signal and a non-measurement subframe in which the terminal cannot measure RRM from a serving cell,
   wherein the predetermined state comprises a first state in which the first small cell can transmit other signals in addition to the discovery signal and a second state in which the first small cell can transmit only the discovery signal.

2. The method of claim 1, further comprising:
   receiving a transmission period of the discovery signal and subframe offset of the discovery signal from the serving cell.

3. The method of claim 2, wherein the measuring of RRM comprises:
   determining the measurement subframe using the measurement subframe bit pattern;
   determining a first subframe in which the discovery signal is received using a transmission period of the discovery signal and subframe offset of the discovery signal; and
   measuring RRM of the first small cell based on the discovery signal in the first subframe of the measurement subframes.

4. The method of claim 2, wherein the receiving of a measurement subframe bit pattern comprises:
   receiving a first measurement subframe bit pattern and a second measurement subframe bit pattern of the measurement subframe bit patterns from the serving cell; and
   receiving first measurement configuration information corresponding to the first measurement subframe bit pattern and second measurement configuration information corresponding to the second measurement subframe bit pattern from the serving cell.

5. The method of claim 4, wherein the first small cell comprises a second small cell and a third small cell, and the measuring of RRM comprises:
   measuring RRM of the second small cell based on the first measurement configuration information; and
   measuring RRM of the third small cell based on the second measurement configuration information.

6. The method of claim 5, wherein a subframe set corresponding to the first measurement subframe bit pattern comprises a subframe that is set to an Almost Blank Subframe (ABS),
   a subframe set corresponding to the second measurement subframe bit pattern comprises a subframe that is set to a non-ABS.

7. A method in which a serving cell transmits a signal for measuring Radio Resource Management (RRM) in an environment in which a macrocell and a plurality of small cells exist, the method comprising:
- transmitting a transmission period of a discovery signal and subframe offset of the discovery signal to a terminal; and
- transmitting a measurement subframe pattern representing a measurement subframe in which RRM measurement based on the discovery signal is allowed and a non-measurement subframe in which the RRM measurement is not allowed to the terminal.

8. The method of claim 7, further comprising setting, by the serving cell, a Measurement Gap (MG) so that the terminal receives the discovery signal that is transmitted in a frequency that is different from a serving frequency used by the serving cell for transmitting the discovery signal and measures RRM.

9. The method of claim 8, wherein the transmitting of a measurement subframe pattern comprises setting a length of the measurement subframe pattern to a least common multiple of a transmission period of the discovery signal and an MG Repetition Period (MGRP).

10. The method of claim 8, wherein the transmitting of a measurement subframe pattern comprises transmitting a first measurement subframe pattern for the serving frequency among the measurement subframe patterns and a second measurement subframe pattern for a frequency that is different from the serving frequency to the terminal.

11. The method of claim 8, wherein the setting of a Measurement Gap (MG) comprises setting, by the serving cell, the MG for the terminal according to whether the terminal has a capability to receive the discovery signal that is transmitted in a frequency that is different from the serving frequency.

12. The method of claim 8, wherein the measurement subframe pattern comprises a first measurement subframe pattern, and
the transmitting of a measurement subframe pattern comprises:
- transmitting the first measurement subframe pattern representing the measurement subframe and the non-measurement subframe belonging to the MG in a bit map form having the same length as that of the MG to the terminal; and
- transmitting, to the terminal, information about a frequency in which the first measurement subframe pattern is to be used.

13. The method of claim 8, wherein the setting of a Measurement Gap (MG) comprises:
- setting a first MG of the MGs; and
- setting a second MG having subframe offset that is different from that of the first MG of the MGs together with the first MG.

14. The method of claim 13, wherein the setting of a second MG comprises setting subframe offset for the second MG to a value that adds a length of the first MG to subframe offset for the first MG.

15. The method of claim 14, wherein the setting of a second MG further comprises setting a length of the second MG so that the sum of lengths that the first MG and the second MG occupy when the second MG is set together with the first MG is equal to or smaller than a length that the first MG occupies when only the first MG is set without the second MG.

16. The method of claim 8, wherein the discovery signal comprises at least one of a Primary Synchronization Signal (PSS), a Secondary Synchronization Signal (SSS), a Cell-specific Reference Signal (CRS), and a Channel State Information-Reference Signal (CSI-RS).

17. The method of claim 8, wherein the setting of a Measurement Gap (MG) comprises:
- setting a length of the MG to a value other than 6 ms; and
- setting an MG Repetition Period (MGRP) so that a ratio between a length of the MG and the MGRP becomes one of 0.15 and 0.075.

18. A method in which a terminal measures Radio Resource Management (RRM) in an environment in which a macrocell and a plurality of small cells exist, the method comprising:
- receiving configuration information of a Measurement Gap (MG) from a serving cell;
- receiving a first measurement subframe pattern representing a measurement subframe in which RRM measurement based on a discovery signal is allowed and a non-measurement subframe in which the RRM measurement is not allowed among subframes that are included in the MG from the serving cell;
- determining the measurement subframe that is included in the MG based on the MG configuration information and the first measurement subframe pattern; and
- measuring RRM in the measurement subframe of the MG using the discovery signal that is transmitted in a frequency that is different from a serving frequency used by the serving cell for transmitting the discovery signal.

19. The method of claim 18, wherein the receiving of configuration information of the Measurement Gap (MG) comprises receiving the MG configuration information comprising subframe offset and a length of a first MG of the MGs and comprising subframe offset and a length of a second MG of the MGs, and
subframe offset of the first MG and subframe offset of the second MG are different.

20. The method of claim 18, wherein the receiving of a first measurement subframe pattern comprises receiving the first measurement subframe pattern in a bit map form having the same length as that of the MG from the serving cell.

* * * * *